(12) United States Patent
Hawkes

(10) Patent No.: US 12,321,577 B2
(45) Date of Patent: Jun. 3, 2025

(54) AVATAR CUSTOMIZATION SYSTEM

(71) Applicant: Snap Inc., Santa Monica, CA (US)

(72) Inventor: Layton Hawkes, Santa Monica, CA (US)

(73) Assignee: SNAP INC., Santa Monica, CA (US)

( * ) Notice: Subject to any disclaimer, the term of this patent is extended or adjusted under 35 U.S.C. 154(b) by 34 days.

(21) Appl. No.: 17/565,281

(22) Filed: Dec. 29, 2021

(65) Prior Publication Data

US 2022/0206675 A1    Jun. 30, 2022

Related U.S. Application Data

(60) Provisional application No. 63/132,888, filed on Dec. 31, 2020.

(51) Int. Cl.
*G06F 3/04842* (2022.01)

(52) U.S. Cl.
CPC .................. *G06F 3/04842* (2013.01)

(58) Field of Classification Search
CPC ...... G06F 3/04842; A63F 13/46; A63F 13/79; A63F 13/63; A63F 2300/5553
See application file for complete search history.

(56) References Cited

U.S. PATENT DOCUMENTS

| | | |
|---|---|---|
| 5,604,843 A | 2/1997 | Shaw et al. |
| 5,689,559 A | 11/1997 | Park |
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

(Continued)

*Primary Examiner* — Ariel Mercado-Vargas
(74) *Attorney, Agent, or Firm* — SCHWEGMAN LUNDBERG & WOESSNER, P.A.

(57) ABSTRACT

In some implementations, a computer system may cause the presentation of a computer-guided process to enable a user to select a digital avatar, apply digital garment to the digital avatar, altar the digital garment as applied to the digital avatar and apply digital accessories to the digital avatar in order to generate a composite digital avatar. The computer system may cause the presentation of a user interface to allow a user to selectively enter the composite digital avatar into a virtual competition. The computer system may receive electronic votes, for the composite digital avatar and within the virtual competition, from a plurality of users of a social network platform. The computer system may determine and present an outcome of the virtual competition on the social networking platform.

20 Claims, 27 Drawing Sheets

(56) References Cited

U.S. PATENT DOCUMENTS

| | | |
|---|---|---|
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,740,978 B2 | 8/2020 | McPhee et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,902,661 B1 | 1/2021 | Mourkogiannis et al. |
| 10,933,311 B2 | 3/2021 | Brody et al. |
| 10,936,157 B2 | 3/2021 | Voss et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,335,088 B2 | 5/2022 | Anvaripour et al. |
| 11,509,615 B2 | 11/2022 | Baldwin et al. |
| 11,517,826 B2 | 12/2022 | Desserrey et al. |
| 11,544,883 B1 | 1/2023 | Charlton et al. |
| 11,607,616 B2 | 3/2023 | Blackstock et al. |
| 11,616,745 B2 | 3/2023 | Blackstock et al. |
| 11,625,873 B2 | 4/2023 | Heikkinen et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |

(56) References Cited

U.S. PATENT DOCUMENTS

| | | |
|---|---|---|
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0143834 A1* | 6/2011 | Guinn ............... G07F 17/32 463/43 |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0310791 A1* | 12/2012 | Weerasinghe ... H04N 21/47815 705/27.2 |
| 2013/0103760 A1 | 4/2013 | Golding et al. |
| 2013/0174055 A1* | 7/2013 | Johnson ............ H04N 21/4758 715/753 |
| 2013/0201187 A1 | 8/2013 | Tong et al. |
| 2013/0249948 A1 | 9/2013 | Reitan |
| 2013/0257877 A1 | 10/2013 | Davis |
| 2013/0296043 A1* | 11/2013 | Weinshanker ......... A63F 13/63 463/30 |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0026016 A1* | 1/2015 | DeVeaux ............... G06T 11/60 705/27.2 |
| 2015/0206349 A1 | 7/2015 | Rosenthal et al. |
| 2016/0134840 A1 | 5/2016 | Mcculloch |
| 2016/0180391 A1* | 6/2016 | Zabaneh ............ G06F 16/9535 705/14.58 |
| 2016/0210602 A1* | 7/2016 | Siddique ............ G06Q 20/047 |
| 2016/0234149 A1 | 8/2016 | Tsuda et al. |
| 2017/0076011 A1* | 3/2017 | Gannon ............. G06F 16/5866 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0252650 A1 | 9/2017 | Vail |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0244407 A1* | 8/2019 | Wiesel ................. G06V 10/255 |
| 2019/0280997 A1 | 9/2019 | Baldwin et al. |
| 2019/0318405 A1* | 10/2019 | Hu ..................... G06F 3/0482 |
| 2020/0077728 A1* | 3/2020 | Gerson ................ D04B 37/02 |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0319148 A1* | 10/2021 | Lai ..................... G06F 3/04845 |
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |

FOREIGN PATENT DOCUMENTS

| | | | |
|---|---|---|---|
| CN | 111282278 | 6/2020 | |
| CN | 116710182 A | 9/2023 | |
| EP | 2177251 | 4/2010 | |
| EP | 2184092 A2 | 5/2010 | |
| EP | 3991120 A1 | 5/2022 | |
| GB | 2522515 | 7/2015 | |
| GB | 2522515 A * | 7/2015 | ........... A63F 13/537 |
| JP | 2001230801 A | 8/2001 | |
| JP | 5497931 B2 | 3/2014 | |
| KR | 101445263 B1 | 9/2014 | |
| KR | 102398539 B1 | 5/2022 | |
| WO | WO-2003094072 A1 | 11/2003 | |
| WO | WO-2004095308 A1 | 11/2004 | |
| WO | WO-2006107182 A1 | 10/2006 | |
| WO | WO-2007134402 A1 | 11/2007 | |
| WO | WO-2012139276 A1 | 10/2012 | |
| WO | WO-2013027893 A1 | 2/2013 | |
| WO | WO-2013152454 A1 | 10/2013 | |
| WO | WO-2013166588 A1 | 11/2013 | |
| WO | WO-2014031899 A1 | 2/2014 | |
| WO | WO-2014194439 A1 | 12/2014 | |
| WO | WO-2016090605 A1 | 6/2016 | |
| WO | WO-2018081013 A1 | 5/2018 | |
| WO | WO-2018102562 A1 | 6/2018 | |
| WO | WO-2018129531 A1 | 7/2018 | |
| WO | WO-2019089613 A1 | 5/2019 | |
| WO | 2022147167 | 7/2022 | |

OTHER PUBLICATIONS

"Bitmoji Chrome Extension", [Online] Retrieved from the Internet: <URL: https://web.archive.org/web/20200919024925/https://support.bimoji.com/hc/en-US/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-US/articles/360034632291-Customize-Text-on-Bitmoji-Stickers, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

(56) References Cited

OTHER PUBLICATIONS

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, John, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Constine, Josh, "Snapchat launces Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmojicustomizable-geofilters-2448152>, (Nov. 18, 2016), 6 pgs.

"International Application Serial No. PCT/US2021/065568, International Search Report mailed May 13, 2022", 4 pgs.

"International Application Serial No. PCT/US2021/065568, Written Opinion mailed May 13, 2022", 9 pgs.

"International Application Serial No. PCT/US2021/065568, International Preliminary Report on Patentability mailed Jul. 13, 2023", 11 pgs.

* cited by examiner

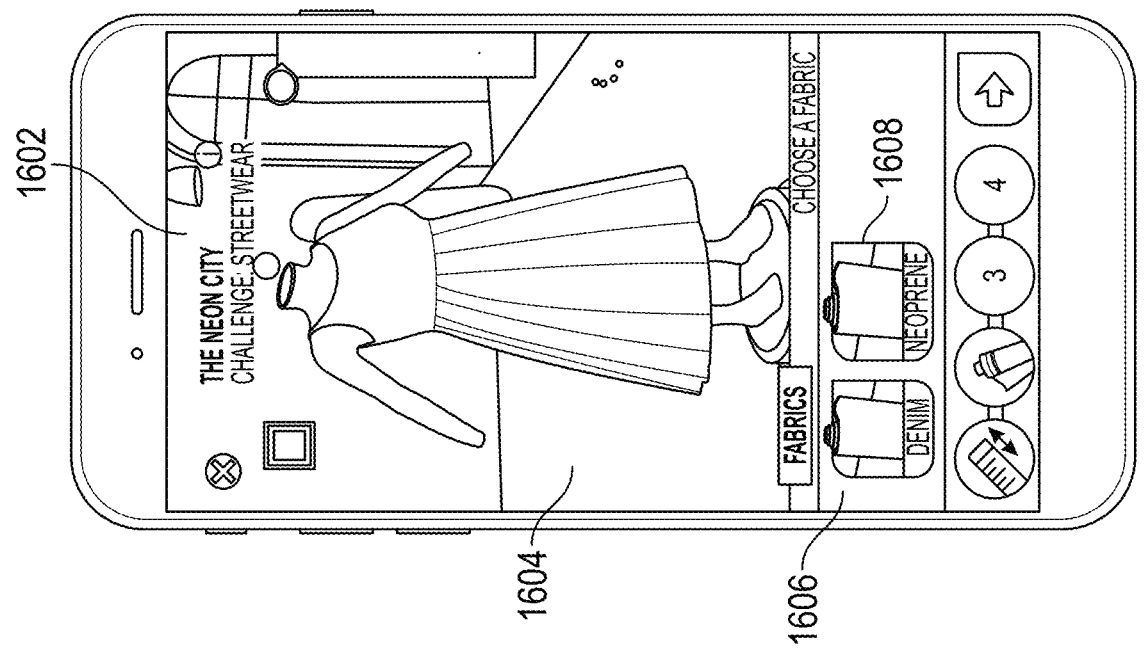
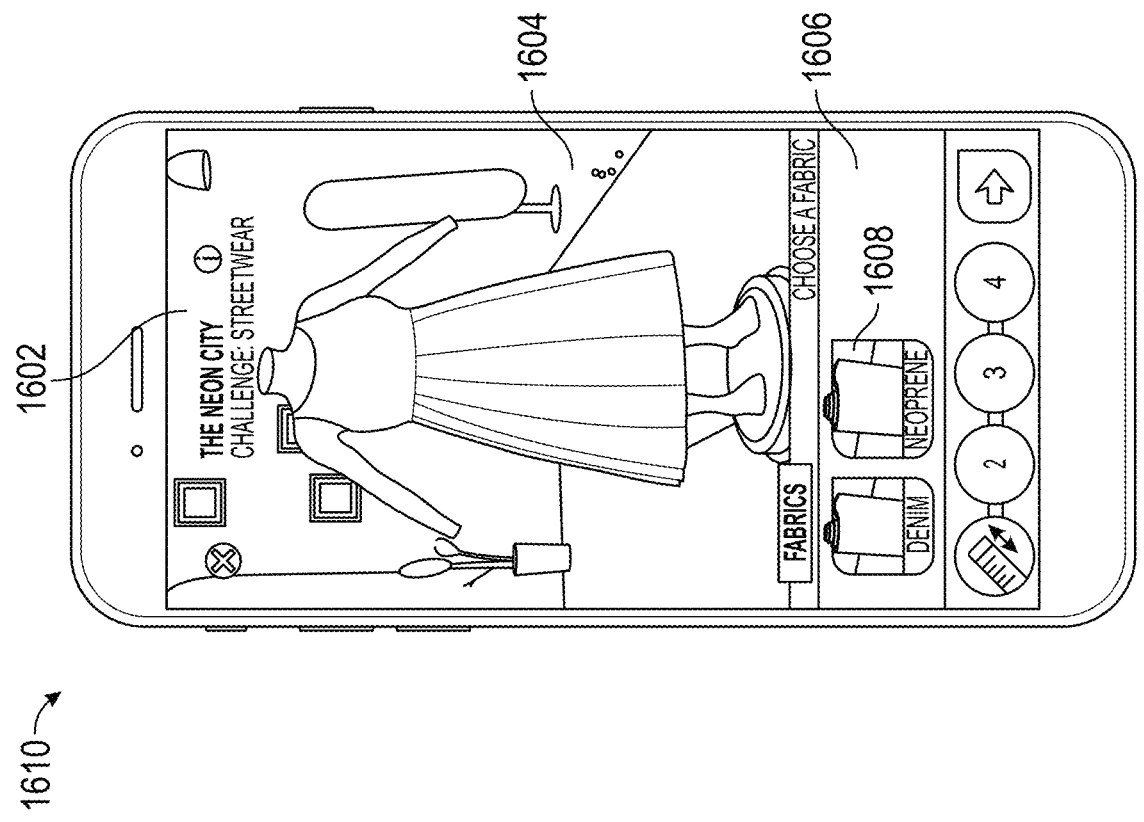
FIG. 16

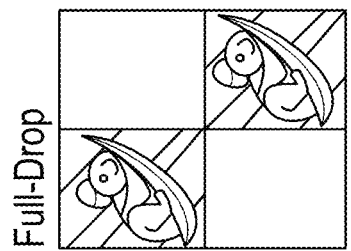
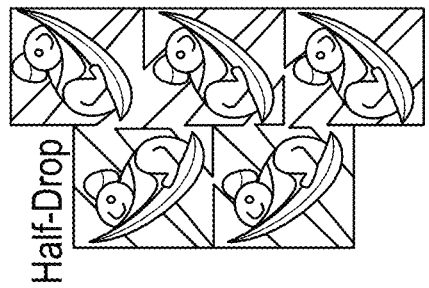
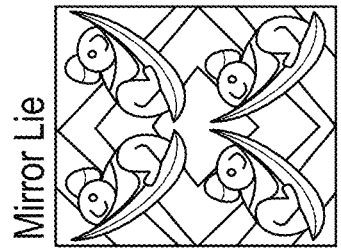
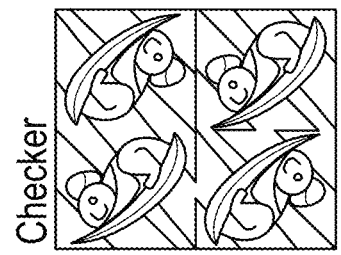
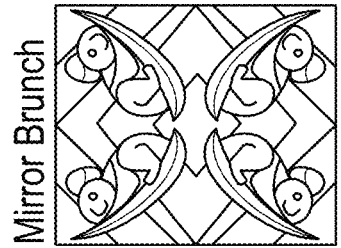
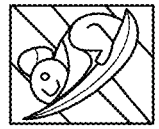
FIG. 18

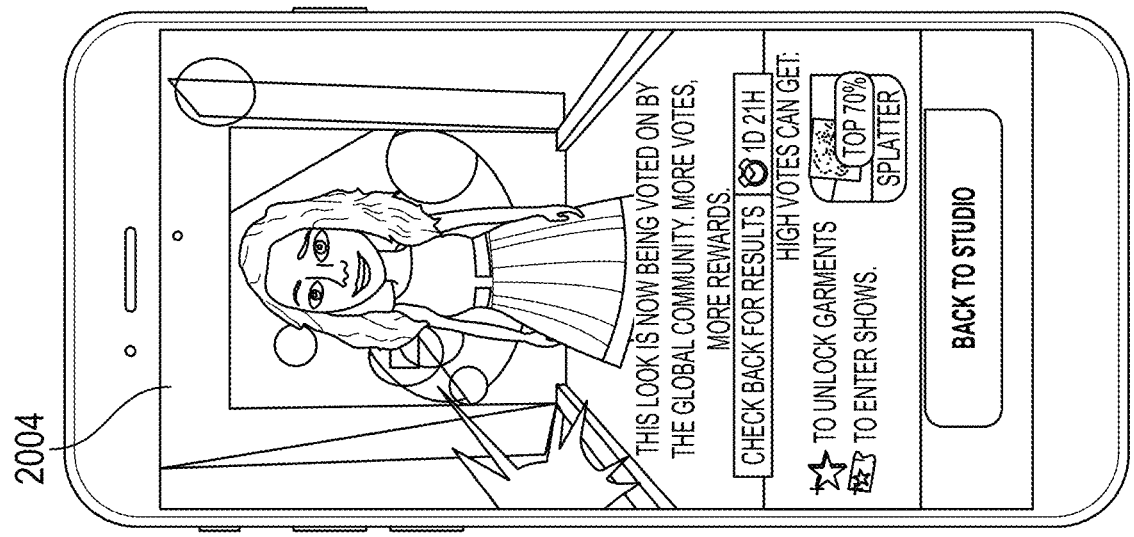
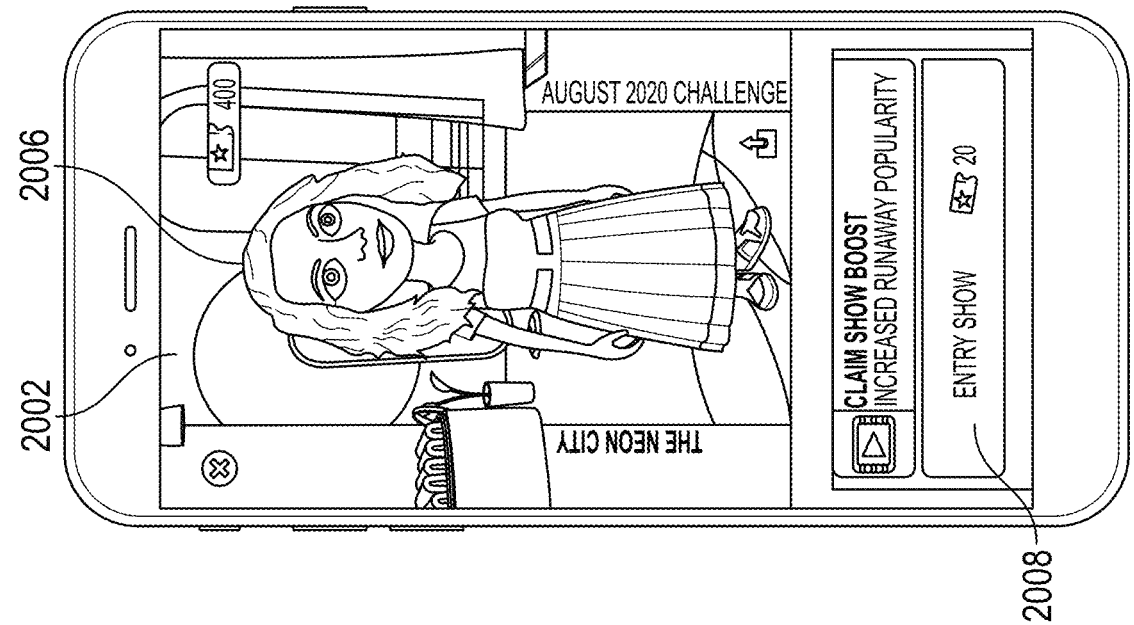
FIG. 20

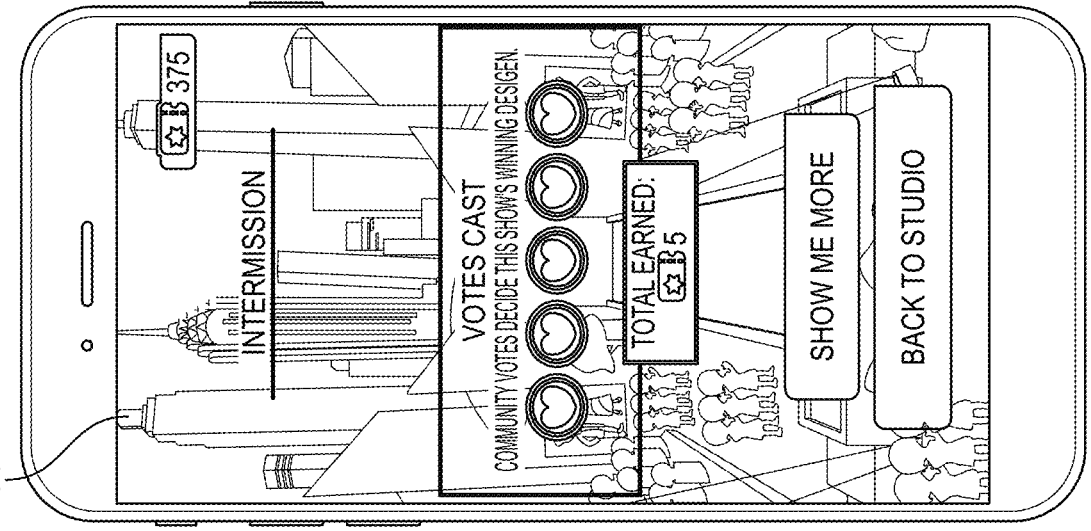
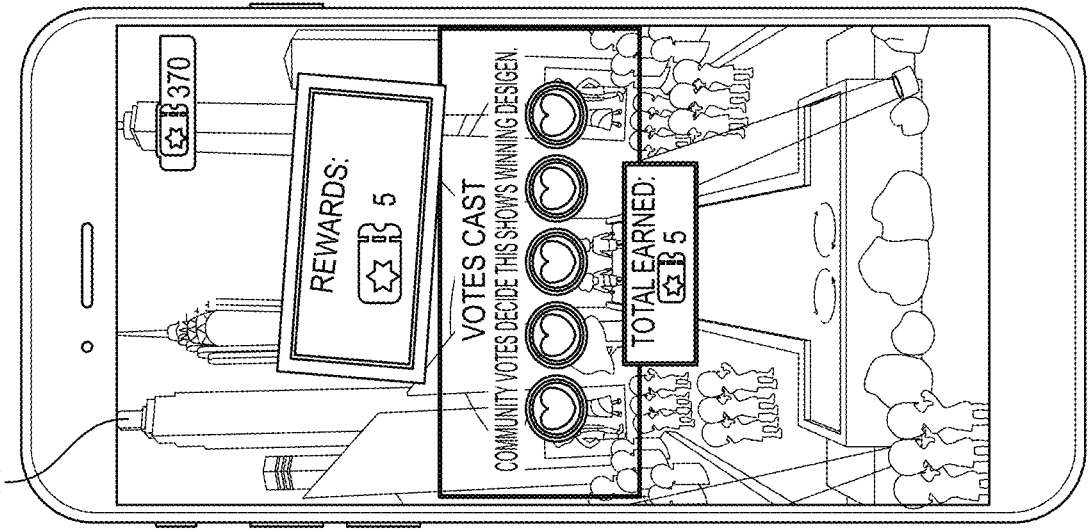
FIG. 23

AVATAR CUSTOMIZATION SYSTEM

CLAIM OF PRIORITY

This application claims the benefit of priority to U.S. Provisional Application Ser. No. 63/132,888, filed on Dec. 31, 2020, which is incorporated herein by reference in its entirety.

BACKGROUND

Digital avatars, and particularly three-dimensional digital avatars, have become increasingly popular as a way of providing a user representation on digital platforms and in digital worlds. The customization of digital avatars is desirable for a number of reasons, including providing an outlet for the creative expression of users on these digital platforms and also to allow the personalization of digital avatars to reflect a desirable characteristic or appearance that a user may wish to impart to the digital avatar. The customization of a digital avatar presents a number of technical challenges, for example, relating to interfaces that allow a user to perform customization of a digital avatar. The person-machine interface provided by a digital avatar creation and customization system presents technical challenges, particularly with respect to making such interfaces accessible to all non-specialist users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 16 is a user interface diagram, illustrating user interfaces, in accordance with some examples.

FIG. 18 is a user interface diagram, illustrating user interfaces, in accordance with some examples.

FIG. 20 is a user interface diagram, illustrating user interfaces, in accordance with some examples.

FIG. 23 is a user interface diagram, illustrating user interfaces, in accordance with some examples.

DETAILED DESCRIPTION

Figure 1:
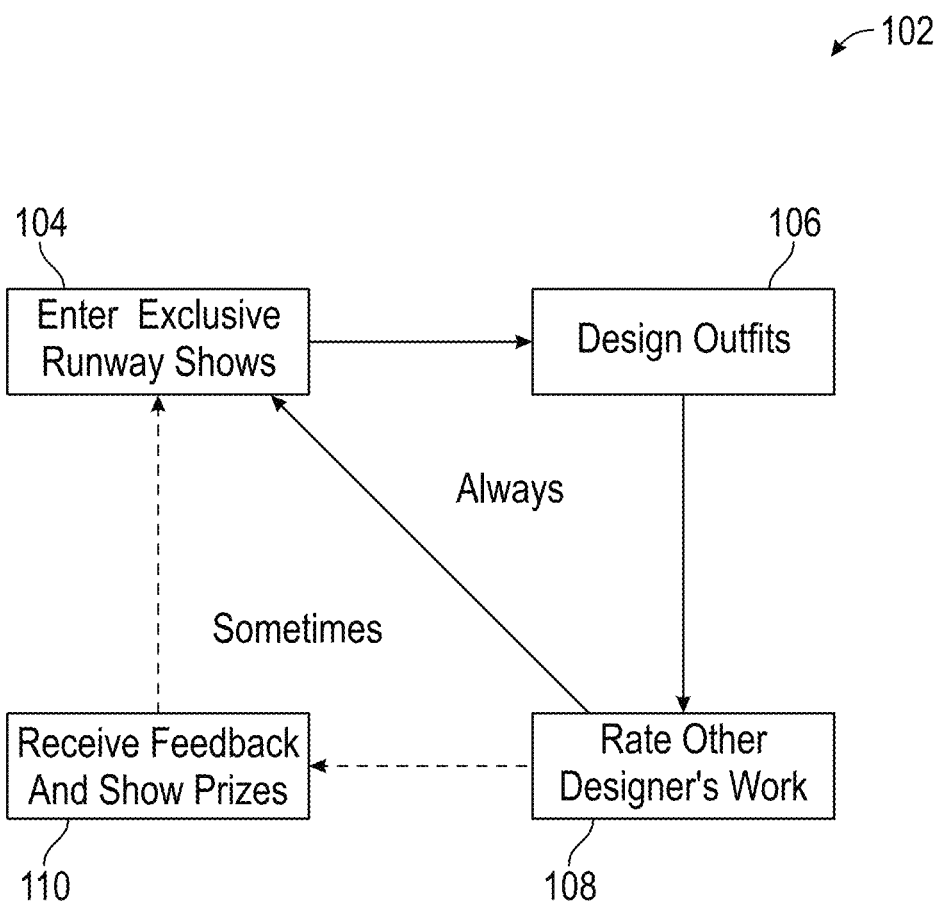
FIG. 1 illustrates an aspect of the subject matter in accordance with some examples.

This disclosure related to example methods, and systems to facilitate the enhancement (e.g., customization) of a digital avatar by a user of an application or a platform (e.g., a gaming platform or a social media platform). In some examples, the customization of a digital avatar is provided within the context of a fashion design game, the game being focused on allowing users (e.g., players) to create and share fashion designs.

The example fashion design game provides a virtual design studio, where players design outfits for specific runway show briefs. Each design submitted to a runway show advances the player's international fashion career and facilitates access to coveted global runway shows. Further, a player's designs enable them to advance within the game, and unlock additional labels of customization options (e.g., fabrics and garment types). Each player additionally receives feedback from other users of the game regarding their designs, for example, by way of a voting mechanism that enables players to vote on a number of runway shows hosted by a platform (e.g., a gaming platform or social platform).

Example fashion games enable players to design a variety of clothing and experiment with a number of runway show "briefs," each brief providing a selection of garment patents, runway models, alteration options, fabrics, prints, and overlays (e.g., stickers).

A player may furthermore gain access to different types of runway shows as they progress in their career: basic, designer, and global. Each of these types of runway shows has specific restrictions and briefs to channel player creativity and provide a progressive exposure to design tools.

Players may furthermore, in some examples, receive feedback on the runway show entries (e.g., fashion-customized digital avatars) and vote on other player's entries. Players receive rewards for earning positive feedback on created design entries and for voting on the design entries of other players. Specific designs may also "go viral," with highly rated and voted upon designs being progressively exposed to an increasing pool of players, for example. The number of votes that a particular design receives may correspond to the amount of exposure that a particular design (or a player that created the design) receives within the game and on a platform. Over time, the votes that a player receives across a number of designs, as well as the amount of voting activity of a player, may cause the platform to advance a player's "career" within the game by providing the player with access to additional game features (e.g., "unlocks").

Turning specifically to career advancement by a player within the game, a player is initially presented with access to a "basic" show from which the player can build their career and exposure. A player may work on developing a niche brand, which may then be advanced to "global" success, gaining the player access to an "international" runway show, and thus enabling the player to expose designs to a much larger audience of the players. Regardless of the stage of a player's fashion career, the player receives garment patterns, and customization unlocks by completing runway shows. These unlocks expand the design pallets available to the player.

FIG. 1 is a process flow diagram illustrating a core process loop 102, according to some examples. The core process loop 102 involves a show entry mechanism 104, a design mechanism 106, a vote mechanism 108 and a reward mechanism 110. Using the show entry mechanism 104, a user (e.g., a player) may select a runway show to enter, following which the design mechanism 106 is activated to enable the player to design a game entry (e.g., a fashion design outfit). Having completed the game entry, the vote mechanism 108 is invoked to enable the player to rate game entries from other players (e.g., by voting on a fashion design outfit), where after the player is provided with feedback and displayed prizes by the reward mechanism 110, or can alternatively be returned to the show entry mechanism 104 to enter a further show.

Examples may be implemented within the context of a gaming platform, a social networking platform, a messaging platform or an interaction platform that combines gaming, social networking, and messaging. Various examples will not be described within the context of an interaction platform supported by an interaction system 300 described below with reference to FIG. 3

Figure 2:
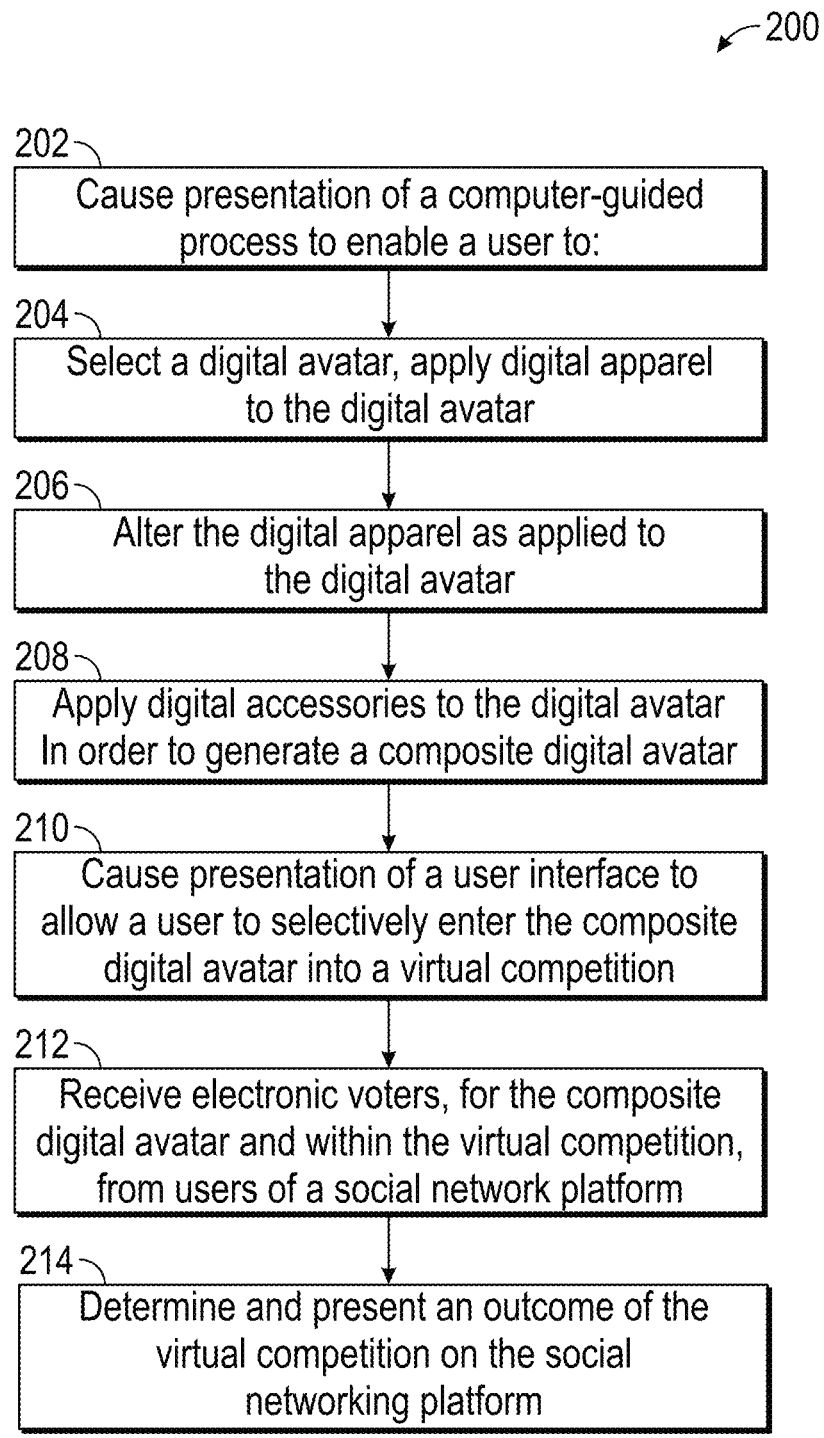
FIG. 2 illustrates a method, in accordance with some examples.

FIG. 2 is a flowchart illustrating a method 200, according to some examples, to generate an enhanced and composite digital avatar for entry into a virtual competition. At a high-level, the method 200 may be viewed as following a flow that includes acceptance of a brief by a player (e.g., a runway show brief), selection of a model digital avatar to enter into a competition, customization of the digital model avatar with a toolset, followed by the entry of the customized digital model avatar into a virtual competition hosted by an interaction platform.

More specifically, the method 200, which may be implemented by a routine or routines executing on a client device, a server device, or a combination of both client and server devices, causes presentation, at block 202 of a computer-guided process that enables a user to:
 at block 204, select a digital avatar and apply a digital garment to the digital avatar;
 at block 206, altar (e.g., customize) the digital garment, as applied to the digital avatar; and
 at block 208, apply digital accessories to the digital avatar in order to generate a composite digital avatar.

At block 210, the method 200 causes the presentation of a further user interface, to allow a user to selectively enter the composite digital avatar into a virtual competition (e.g., a virtual passenger at).

At block 212, the method 200 receives votes, for the composite digital avatar, generated by a particular player, as well as for other composite digital avatars created by other players, within the virtual competition. The competing, composite digital avatars may have been created by a number of users (e.g., players) of an interaction platform a social network platform or a messaging platform).

At block 214, the method 200 then determines and presents an outcome of the virtual competition on the interaction platform. This outcome of the virtual competition may include presenting a winner from a number of composite digital avatars entered within the virtual competition and also presenting various unlocks, incentives, and other rewards to players based on the received votes and participation.

Further details of the various operations of the method 200 will be described below with reference to specific examples. Details of computer and networking infrastructure, within the context of an interaction system 300, will be described with reference to FIG. 3-FIG. 24. In some examples, the method 200 may be implemented within the context of a fashion design game 416, shown in FIG. 4.

NETWORKED COMPUTING ENVIRONMENT

Figure 3:
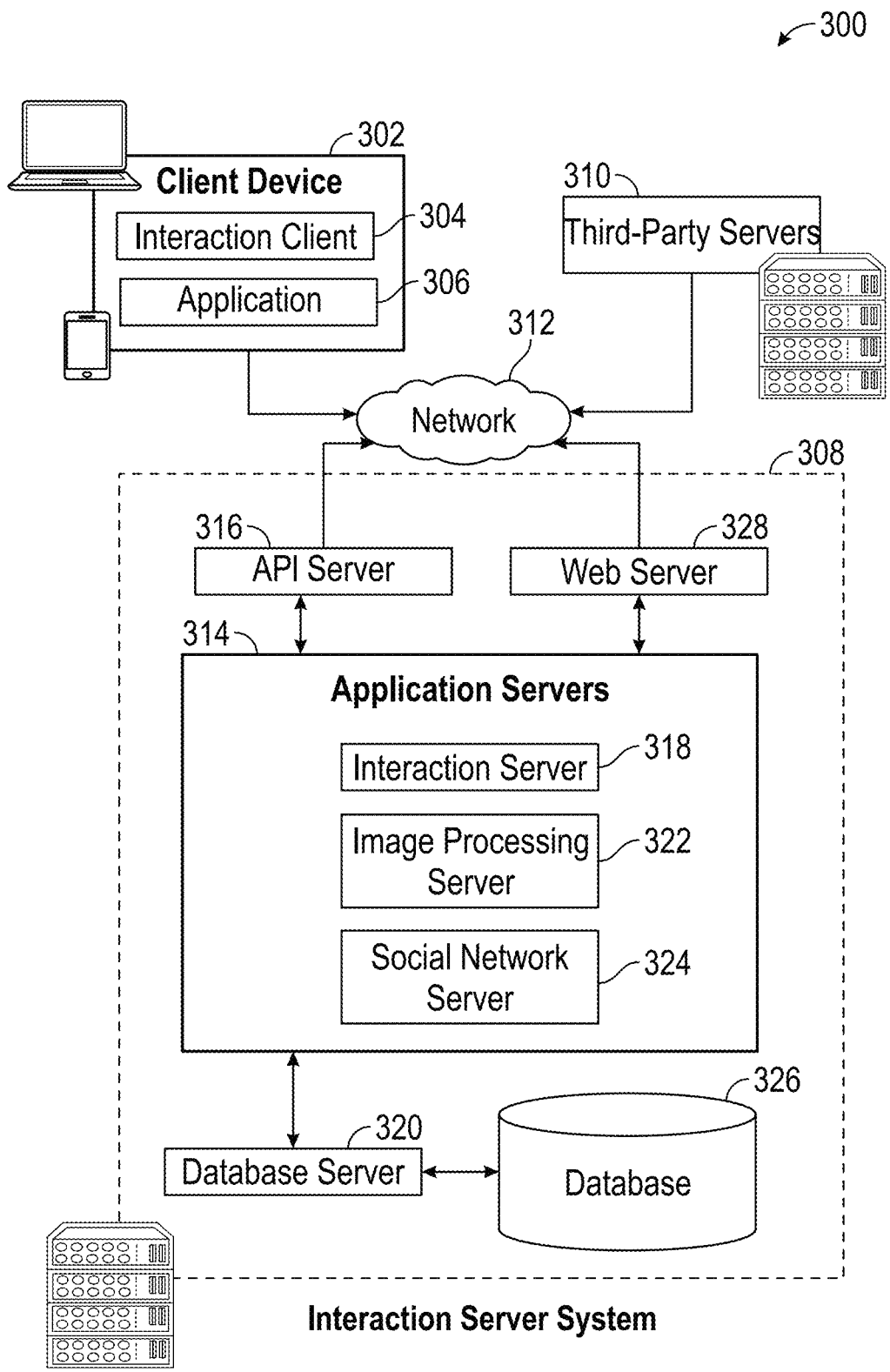
FIG. 3 is a diagrammatic representation of a networked environment in which the present disclosure may be deployed, in accordance with some examples.

FIG. 3 is a block diagram showing an example interaction system 300 for exchanging data (e.g., messages and associated content) and enabling a range of user interactions over a network. The interaction system 300 includes multiple instances of a client device 302, each of which hosts a number of applications, including an interaction client 304 and other applications 306. Each interaction client 304 is communicatively coupled to other instances of the interaction client 304 (e.g., hosted on respective other client devices 302), an interaction server system 308 and third-party servers 310 via a network 312 (e.g., the Internet). An interaction client 304 can also communicate with locally-hosted applications 306 using Applications Program Interfaces (APIs).

An interaction client 304 is able to communicate and exchange data with other interaction clients 304 and with the interaction server system 308 via the network 312. The data exchanged between interaction client 304, and between an interaction client 304 and the interaction server system 308, includes functions (e.g., commands to invoke functions) as well as payload data (e.g., text, audio, video, or other multimedia data).

The interaction server system 308 provides server-side functionality via the network 312 to a particular interaction client 304. While certain functions of the interaction system 300 are described herein as being performed by either an interaction client 304 or by the interaction server system 308, the location of certain functionality either within the interaction client 304 or the interaction server system 308 may be a design choice. For example, it may be technically preferable to initially deploy certain technology and functionality within the interaction server system 308 but to later migrate this technology and functionality to the interaction client 304 where a client device 302 has sufficient processing capacity.

The interaction server system 308 supports various services and operations that are provided to the interaction client 304. Such operations include transmitting data to, receiving data from, and processing data generated by the interaction client 304. This data may include message content, client device information, geolocation information, media augmentation and overlays, message content persistence conditions, social network information, and live event information, as examples. Data exchanges within the interaction system 300 are invoked and controlled through functions available via user interfaces (UIs) of the interaction client 304.

Turning now specifically to the interaction server system 308, an Application Program Interface (API) server 316 is coupled to, and provides a programmatic interface to, application servers 314. The application servers 314 are communicatively coupled to a database server 320, which facilitates access to a database 326 that stores data associated with messages processed by the application servers 314. Similarly, a web server 328 is coupled to the application servers 314, and provides web-based interfaces to the application servers 314. To this end, the web server 328 processes incoming network requests over the Hypertext Transfer Protocol (HTTP) and several other related protocols.

The Application Program Interface (API) server 316 receives and transmits message data (e.g., commands and message payloads) between the client device 302 and the application servers 314. Specifically, the Application Program Interface (API) server 316 provides a set of interfaces (e.g., routines and protocols) that can be called or queried by the interaction client 304 in order to invoke functionality of the application servers 314. The Application Program Interface (API) server 316 exposes various functions supported by the application servers 314, including account registration, login functionality, the sending of messages, via the application servers 314, from a particular interaction client 304 to another interaction client 304, the sending of media files images or video) from an interaction client 304 to an interaction server 318, and for possible access by another interaction client 304, the settings of a collection of media data (e.g., story), the retrieval of a list of friends of a user of a client device 302, the retrieval of such collections, the retrieval of messages and content, the addition and deletion of entities (e.g., friends) to an entity graph (e.g., a social graph), the location of friends within a social graph, and opening an application event (e.g., relating to the interaction client 304).

The application servers 314 host a number of server applications and subsystems, including, for example, an interaction server 318, an image processing server 322, and a social network server 324. The interaction server 318 implements a number of message processing technologies and functions, particularly related to the aggregation and other processing of content (e.g., textual and multimedia content) included in messages received from multiple instances of the interaction client 304. As will be described in further detail, the text and media content from multiple sources may be aggregated into collections of content (e.g., called stories or galleries). These collections are then made available to the interaction client 304. Other processor and memory intensive processing of data may also be performed server-side by the interaction server 318, in view of the hardware requirements for such processing.

The application servers 314 also include an image processing server 322 that is dedicated to performing various image processing operations, typically with respect to images or video within the payload of a message sent from or received at the interaction server 318.

Figure 5:
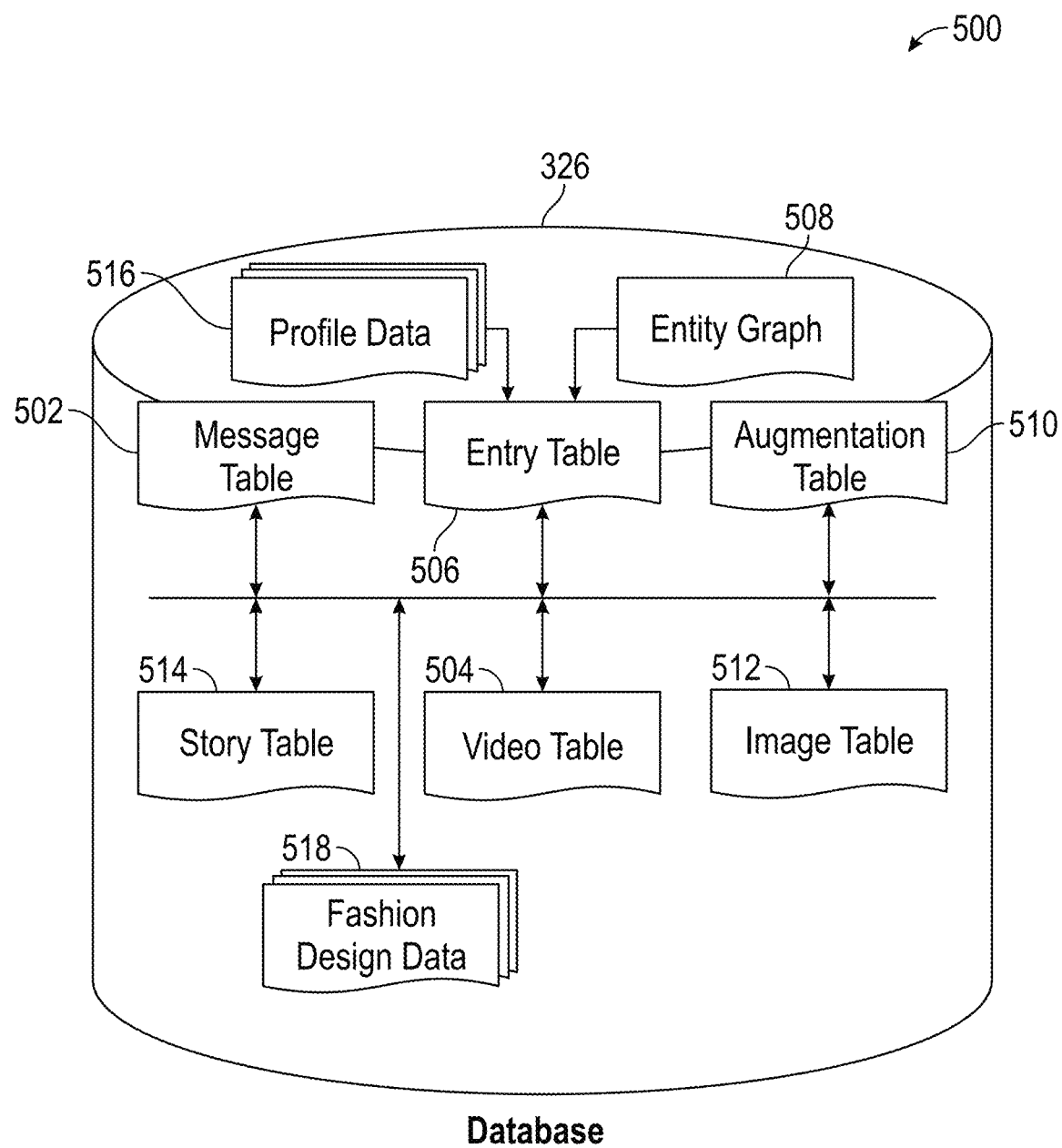
FIG. 5 is a diagrammatic representation of a data structure as maintained in a database, in accordance with some examples.

The social network server 324 supports various social networking functions and services and makes these functions and services available to the interaction server 318. To this end, the social network server 324 maintains and accesses an entity graph 508 (as shown in FIG. 5) within the database 326. Examples of functions and services supported by the social network server 324 include the identification of other users of the interaction system 300 with which a particular user has relationships or is "following," and also the identification of other entities and interests of a particular user.

a plurality of fashion design selections associated with a selected design theme. Returning to the interaction client 304, features and functions of an external resource (e.g., an application 306 or apples) are made available to a user via an interface of the interaction client 304. In this context, "external" refers to the fact that the application 306 or applet is external to the interaction client 304. The external resource is often provided by a third party but may also be provided by the creator or provider of the interaction client 304. The interaction client 304 receives a user selection of an option to launch or access features of such an external resource. The external resource may be the application 306 installed on the client device 302 (e.g., a "native app"), or a small-scale version of the application (e.g., an "applet") that is hosted on the client device 302 or remote of the client device 302 (e.g., on third-party servers 310). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 304. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 304 determines whether the selected external resource is a web-based external resource or a locally-installed application 306. In some cases, applications 306 that are locally installed on the client device 302 can be launched independently of and separately from the interaction client 304, such as by selecting an icon, corresponding to the application 306, on a home screen of the client device 302. Small-scale versions of such applications can be launched or accessed via the interaction client 304 and, in some examples, no or limited portions of the small-scale application can be accessed outside of the interaction client 304. The small-scale application can be launched by the interaction client 304 receiving, from a third-party server 310 for example, a markup-language document associated with the small-scale application and processing such a document.

In response to determining that the external resource is a locally-installed application 306, the interaction client 304 instructs the client device 302 to launch the external resource by executing locally-stored code corresponding to the external resource. In response to determining that the external resource is a web-based resource, the interaction client 304 communicates with the third-party servers 310 (for example) to obtain a markup-language document corresponding to the selected external resource. The interaction client 304 then processes the obtained markup-language document to present the web-based external resource within a user interface of the interaction client 304.

In some examples, a computer-implemented method includes causing the presentation of a computer-guided process to enable a user to select a digital avatar, apply a digital garment to the digital avatar, modify the digital garment as applied to the digital avatar, and apply digital augmentations to the digital avatar in order to generate a composite digital avatar. The computer-implemented method also includes causing the The interaction client 304 can notify a user of the client device 302, or other users related to such a user (e.g., "friends"), of activity taking place in one or more external resources. For example, the interaction client 304 can provide participants in a conversation (e.g., a chat session) in the interaction client 304 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 304, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 304. The external resource can selectively include different media items in the responses, based on a current context of the external resource.

The interaction client 304 can present a list of the available external resources (e.g., applications 306 or applets) to a user to launch or access a given external resource. This list can be presented in a context-sensitive menu. For example, the icons representing different ones of the application 306 (or applets) can vary based on how the menu is launched by the user (e.g., from a conversation interface or from a non-conversation interface).

SYSTEM ARCHITECTURE

Figure 4:
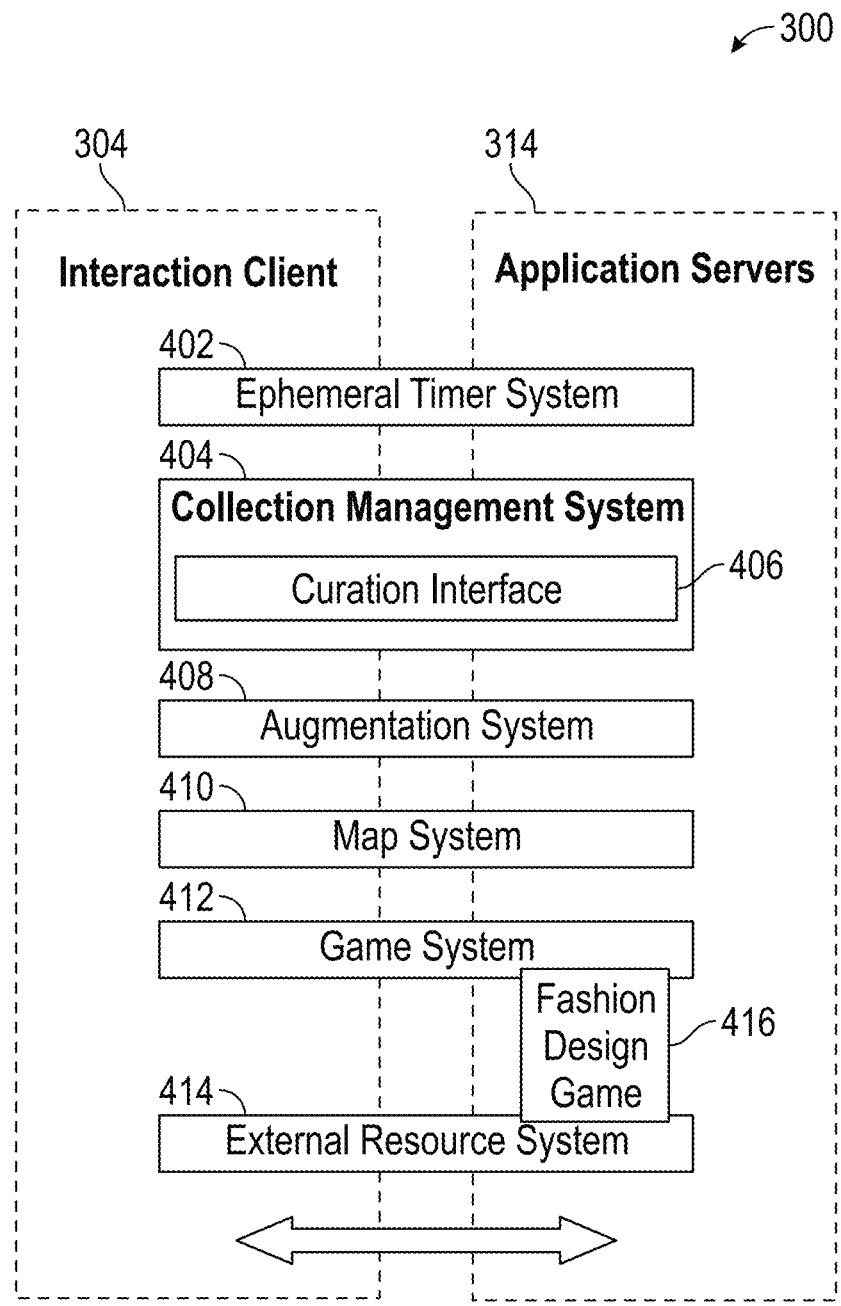
FIG. 4 is a diagrammatic representation of a messaging system, in accordance with some examples, that has both client-side and server-side functionality.

FIG. 4 is a block diagram illustrating further details regarding the interaction system 300, according to some examples. Specifically, the interaction system 300 is shown to comprise the interaction client 304 and the application servers 314. The interaction system 300 embodies a number of subsystems, which are supported on the client-side by the interaction client 304 and on the sever-side by the application servers 314. These subsystems include, for example, an ephemeral timer system 402, a collection management system 404, an augmentation system 408, a map system 410, a game system 412, and an external resource system 414. In some examples, the game system 412. supports a number of games, including an avatar customization game in the form of a fashion design game 416 that provides a fashion design game environment as described herein.

The ephemeral timer system 402 is responsible for enforcing the temporary or time-limited access to content by the interaction client 304 and the interaction server 318. The ephemeral timer system 402 incorporates a number of timers that, based on duration and display parameters associated with a message, or collection of messages (e.g., a story), selectively enable access (e.g., for presentation and display) to messages and associated content via the interaction client 304. Further details regarding the operation of the ephemeral timer system 402 are provided below.

The collection management system 404 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 404 may also be responsible for publishing an icon that provides notification of the existence of a particular collection to the user interface of the interaction client 304.

The collection management system 404 furthermore includes a curation interface 406 that allows a collection manager to manage and curate a particular collection of content. For example, the curation interface 406 enables an event organizer to curate a collection of content relating to a specific event (e.g., delete inappropriate content or redundant messages). Additionally, the collection management system 404 employs machine vision (or image recognition technology) and content rules to automatically curate a content collection. In certain examples, compensation may be paid to a user for the inclusion of user-generated content into a collection. In such cases, the collection management system 404 operates to automatically make payments to such users for the use of their content.

The augmentation system 408 provides various functions that enable a user to augment (e.g., annotate or otherwise modify or edit) media content associated with a message or a game. For example, the augmentation system 408 provides functions related to the generation and publishing of media overlays for messages processed by the interaction system 300. The augmentation system 408 operatively supplies a media overlay or augmentation (e.g., an image filter) to the interaction client 304 based on a geolocation of the client device 302. In another example, the augmentation system 408 operatively supplies a media overlay to the interaction client 304 based on other information, such as social network information of the user of the client device 302. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 302. For example, the media overlay may include text or image that can be overlaid on top of a photograph taken by the client device 302. In another example, the media overlay includes an identification of a location overlay (e.g., Venice beach), a name of a live event, or a name of a merchant overlay (e.g., Beach Coffee House). In another example, the augmentation system 408 uses the geolocation of the client device 302 to identify a media overlay that includes the name of a merchant at the geolocation of the client device 302. The media overlay may include other indicia associated with the merchant. The media overlays may be stored in the database 326 and accessed through the database server 320.

In particular, the augmentation system 408 interacts with the game system 412 to support the customization of an avatar by a user within the context of the fashion design game 416. Various fashion overlays that are provided within the context of a game may be provided by the augmentation system 408 to the game system 412.

In some examples, the augmentation system 408 provides a user-based publication platform that enables users to select a geolocation on a map and upload content associated with the selected geolocation. The user may also specify circumstances under which a particular media overlay should be offered to other users. The augmentation system 408 generates a media overlay that includes the uploaded content and associates the uploaded content with the selected geolocation.

In other examples, the augmentation system 408 provides a merchant-based publication platform that enables merchants to select a particular media overlay associated with a geolocation via a bidding process. For example, the augmentation system 408 associates the media overlay of the highest bidding merchant with a corresponding geolocation for a predefined amount of time.

The map system 410 provides various geographic location functions, and supports the presentation of map-based media content and messages by the interaction client 304. For example, the map system 410 enables the display of user icons or avatars (e.g., stored in profile data 516) on a map to indicate a current or past location of "friends" of a user, as well as media content (e.g., collections of messages including photographs and videos) generated by such friends, within the context of a map. For example, a message posted by a user to the interaction system 300 from a specific geographic location may be displayed within the context of a map at that particular location to "friends" of a specific user on a map interface of the interaction client 304. A user can furthermore share his or her location and status information (e.g., using an appropriate status avatar) with other users of the interaction system 300 via the interaction client 304, with this location and status information being similarly displayed within the context of a map interface of the interaction client 304 to selected users.

The game system 412 provides various gaming functions within the context of the interaction client 304. The interaction client 304 provides a game interface providing a list of available games that can be launched by a user within the context of the interaction client 304, and played with other users of the interaction system 300. The interaction system 300 further enables a particular user to invite other users to participate in the play of a specific game, by issuing invitations to such other users from the interaction client 304. The interaction client 304 also supports both the voice and text messaging (e.g., chats) within the context of gameplay, provides a leaderboard for the games, and also supports the provision of in-game rewards (e.g., coins and items).

The external resource system 414 provides an interface for the interaction client 304 to communicate with remote servers (e.g., third-party servers 310) to launch or access external resources, e.g., applications or applets. The fashion design game 416 described herein and supported by the game system 412 is an example of such an application. A third-party server 310 hosts, for example, a markup language (e.g., HTML5) based application or small-scale version of an application (e.g., game, utility, payment, or ride-sharing application). The interaction client 304 may launches a web-based resource (e.g., an application such as the fashion design game 416) by accessing the HTML5 file from the third-party servers 310 associated with the web-based resource. In certain examples, applications hosted by third-party servers 310 are programmed in JavaScript leveraging a Software Development Kit (SDK) provided by the interaction server 318. The SDK includes Application Programming Interfaces (APIs) with functions that can be called or invoked by the web-based application. In certain examples, the interaction server 318 includes a JavaScript library that provides a given external resource access to certain user data of the interaction client 304. HTML5 is used as an example technology for programming games, but applications and resources programmed based on other technologies can be used.

In order to integrate the functions of the SDK into the web-based resource, the SDK is downloaded by a third-party server 310 from the interaction server 318 or is otherwise received by the third-party server 310. Once downloaded or received, the SDK is included as part of the application code of a web-based external resource. The code of the web-based resource can then call or invoke certain functions of the SDK to integrate features of the interaction client 304 into the web-based resource.

The SDK stored on the interaction server 318 effectively provides the bridge between an external resource (e.g., applications 306 or applets and the interaction client 304. This provides the user with a seamless experience of communicating with other users on the interaction client 304, while also preserving the look and feel of the interaction client 304. To bridge communications between an external resource and an interaction client 304, in certain examples, the SDK facilitates communication between third-party servers 310 and the interaction client 304. In certain examples, a WebViewJavaScriptBridge running on a client device 302 establishes two one-way communication channels between an external resource and the interaction client 304. Messages are sent between the external resource and the interaction client 304 via these communication channels asynchronously. Each SDK function invocation is sent as a message and callback. Each SDK function is implemented by constructing a unique callback identifier and sending a message with that callback identifier.

By using the SDK, not all information from the interaction client 304 is shared with third-party servers 310. The SDK limits which information is shared based on the needs of the external resource. In certain examples, each third-party server 310 provides an HTML5 file corresponding to the web-based external resource to the interaction server 318. The interaction server 318 can add a visual representation (such as a box art or other graphic) of the web-based external resource in the interaction client 304. Once the user selects the visual representation or instructs the interaction client 304 through a GUI of the interaction client 304 to access features of the web-based external resource, the interaction client 304 obtains the HTML5 file and instantiates the resources necessary to access the features of the web-based external resource.

The interaction client 304 presents a graphical user interface (e.g., a landing page or title screen) for an external resource. During, before, or after presenting the landing page or title screen, the interaction client 304 determines whether the launched external resource has been previously authorized to access user data of the interaction client 304. In response to determining that the launched external resource has been previously authorized to access user data of the interaction client 304, the interaction client 304 presents another graphical user interface of the external resource that includes functions and features of the external resource. In response to determining that the launched external resource has not been previously authorized to access user data of the interaction client 304, after a threshold period of time (e.g., 3 seconds) of displaying the landing page or title screen of the external resource, the interaction client 304 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the interaction client 304 adds the external resource to a list of authorized external resources and allows the external resource to access user data from the interaction client 304. In some examples, the external resource is authorized by the interaction client 304 to access the user data in accordance with an OAuth 2 framework.

The interaction client 304 controls the type of user data that is shared with external resources based on the type of external resource being authorized. For example, external resources that include full-scale applications (e.g., an application 306) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

DATA ARCHITECTURE

FIG. 5 is a schematic diagram illustrating data structures 500, which may be stored in the database 326 of the interaction server system 308, according to certain examples. While the content of the database 326 is shown to comprise a number of tables, it will be appreciated that the data could be stored in other types of data structures (e.g., as an object-oriented database).

The database 326 includes message data stored within a message table 502. This message data includes, for any particular one message, at least message sender data, message recipient (or receiver) data, and a payload. Further details regarding information that may be included in a message, and included within the message data stored in the message table 502 is described below with reference to FIG. 24.

An entity table 506 stores entity data, and is linked (e.g., referentially) to an entity graph 508 and profile data 516. Entities for which records are maintained within the entity table 506 may include individuals, corporate entities, organizations, objects, places, events, and so forth. Regardless of entity type, any entity regarding which the interaction server system 308 stores data may be a recognized entity. Each entity is provided with a unique identifier, as well as an entity type identifier (not shown).

The entity graph 508 stores information regarding relationships and associations between entities. Such relationships may be social, professional (e.g., work at a common corporation or organization) interested-based or activity-based, merely for example.

The profile data 516 stores multiple types of profile data about a particular entity. The profile data 516 may be selectively used and presented to other users of the interaction system 300, based on privacy settings specified by a particular entity. Where the entity is an individual, the profile data 516 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 300, and on map interfaces displayed by interaction clients 304 to other users. The collection of avatar representations may include "status avatars," which present a graphical representation of a status or activity that the user may select to communicate at a particular time.

Where the entity is a group, the profile data 516 for the group may similarly include one or more avatar representations associated with the group, in addition to the group name, members, and various settings (e.g., notifications) for the relevant group.

The database 326 also stores augmentation data, such as overlays or filters, in an augmentation table 510. The augmentation data is associated with and applied to videos (for which data is stored in a video table 504) and images (for which data is stored in an image table 512).

Filters, in some examples, are overlays that are displayed as overlaid on an image or video during presentation to a recipient user. Filters may be of various types, including user-selected filters from a set of filters presented to a sending user by the interaction client 304 when the sending user is composing a message. Other types of filters include geolocation filters (also known as geo-filters), which may be presented to a sending user based on geographic location. For example, geolocation filters specific to a neighborhood or special location may be presented within a user interface by the interaction client 304, based on geolocation information determined by a Global Positioning System (GPS) unit of the client device 302.

Another type of filter is a data filter, which may be selectively presented to a sending user by the interaction client 304, based on other inputs or information gathered by the client device 302 during the message creation process. Examples of data filters include current temperature at a specific location, a current speed at which a sending user is traveling, battery life for a client device 302, or the current time.

Other augmentation data that may be stored within the image table 512 includes augmented reality content items (e.g., corresponding to applying Lenses or augmented reality experiences). An augmented reality content item may be a real-time special effect and sound that may be added to an image or a video.

The method may also include where the virtual competition has a theme, as described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 302 and then displayed on a screen of the client device 302 with the modifications. This also includes modifications to stored content, such as video clips in a gallery that may be modified. For example, in a client device 302 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 302 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some examples, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 302) and perform complex image manipulations locally on the client device 302 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 302.

In some examples, a computer animation model to transform image data can be used by a system where a user may capture an image or video stream of the user (e.g., a selfie) using a client device 302 having a neural network operating as part of an interaction client 304 operating on the client device 302. The transformation system operating within the interaction client 304 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 302 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 514 stores data regarding collections of messages and associated image, video, or audio data, which are compiled into a collection (e.g., a story or a gallery). The creation of a particular collection may be initiated by a particular user (e.g., each user for which a record is maintained in the entity table 506). A user may create a "personal story" in the form of a collection of content that has been created and sent/broadcast by that user. To this end, the user interface of the interaction client 304 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the interaction client 304, to contribute content to a particular live story. The live story may be identified to the user by the interaction client 304, based on his or her location. The end result is a "live story" told from a community perspective.

A further type of content collection is known as a "location story," which enables a user whose client device 302 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 504 stores video data that, in some examples, is associated with messages for which records are maintained within the message table 502. Similarly, the image table 512 stores image data associated with messages for which message data is stored in the entity table 506. The entity table 506 may associate various augmentations from the augmentation table 510 with various images and videos stored in the image table 512 and the video table 504.

The database 326 further stores fashion design data 518, which indexes into data of other tables (e.g., the profile data 516, the entity graph 508, the augmentation table 510 and the image table 512) to support execution of a fashion design game 416.

Figure 6:
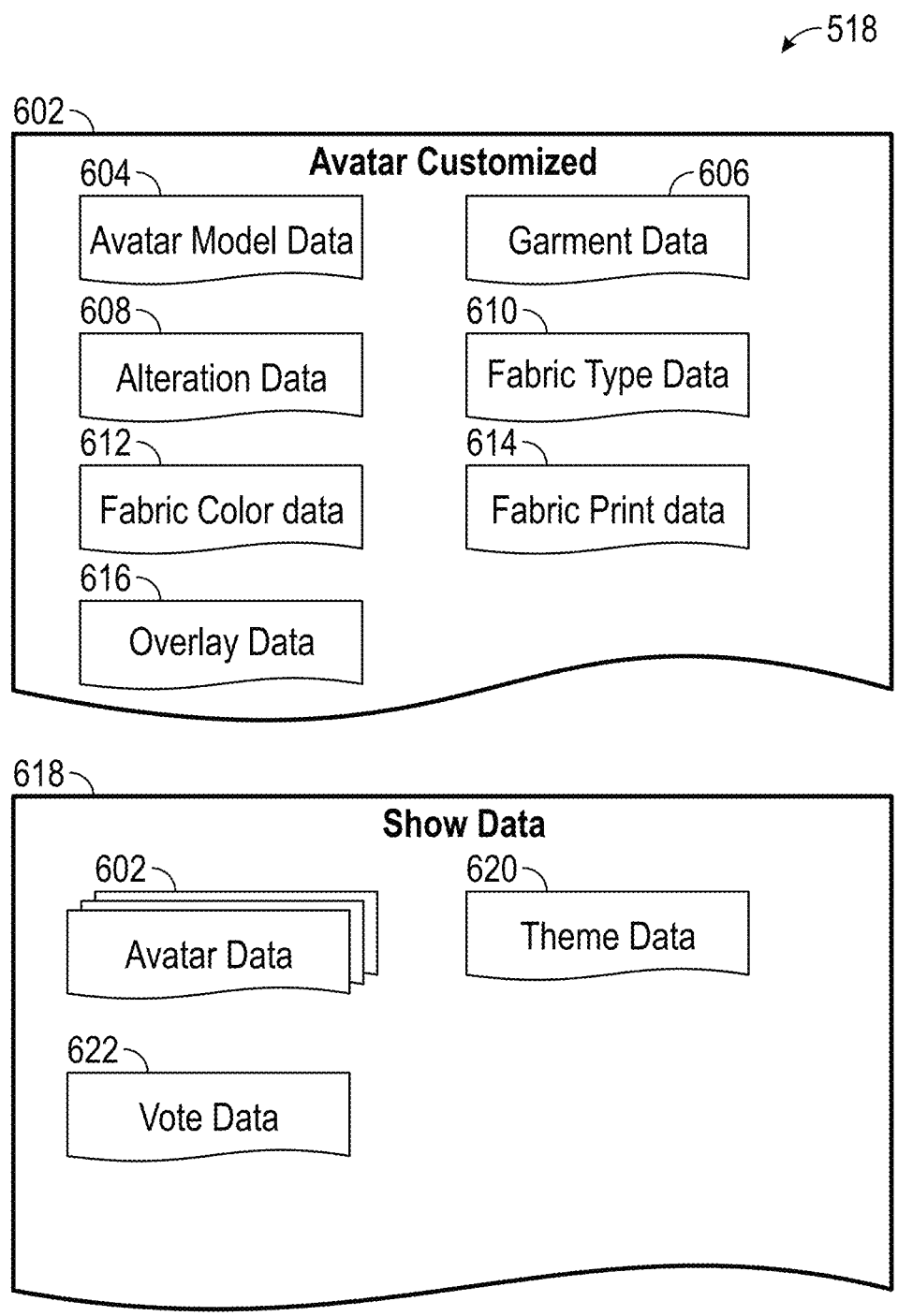
FIG. 6 is a block diagram illustrating a data model, in accordance with some examples.

FIG. 6 is a data diagram illustrating further details regarding the fashion design data 518, according to some examples. The fashion design data 518 comprises two broad types of data, namely avatar data 602 and show data 618. The avatar data 602 includes avatar model data 604, garment data 606, alteration data 608, fabric type data 610, fabric color data 612, fabric print data 614, and overlay data 616. Each of these data types represents an aspect of a customized digital avatar that may be deployed within the context of a game (e.g., the fashion design game 416).

Similarly, the show data 618 comprises avatar data 602, theme data 620, and vote data 622. The avatar data 602 includes data associated with each customized digital avatar that has been entered for a particular show. The vote data 622 reflects votes that have been cast for each of the customized avatars entered in the relevant show. The theme data 620 includes data for customization of a show, and are related to customization options that are presented during the design process to a player for customization of a digital avatar.

Figure 7:
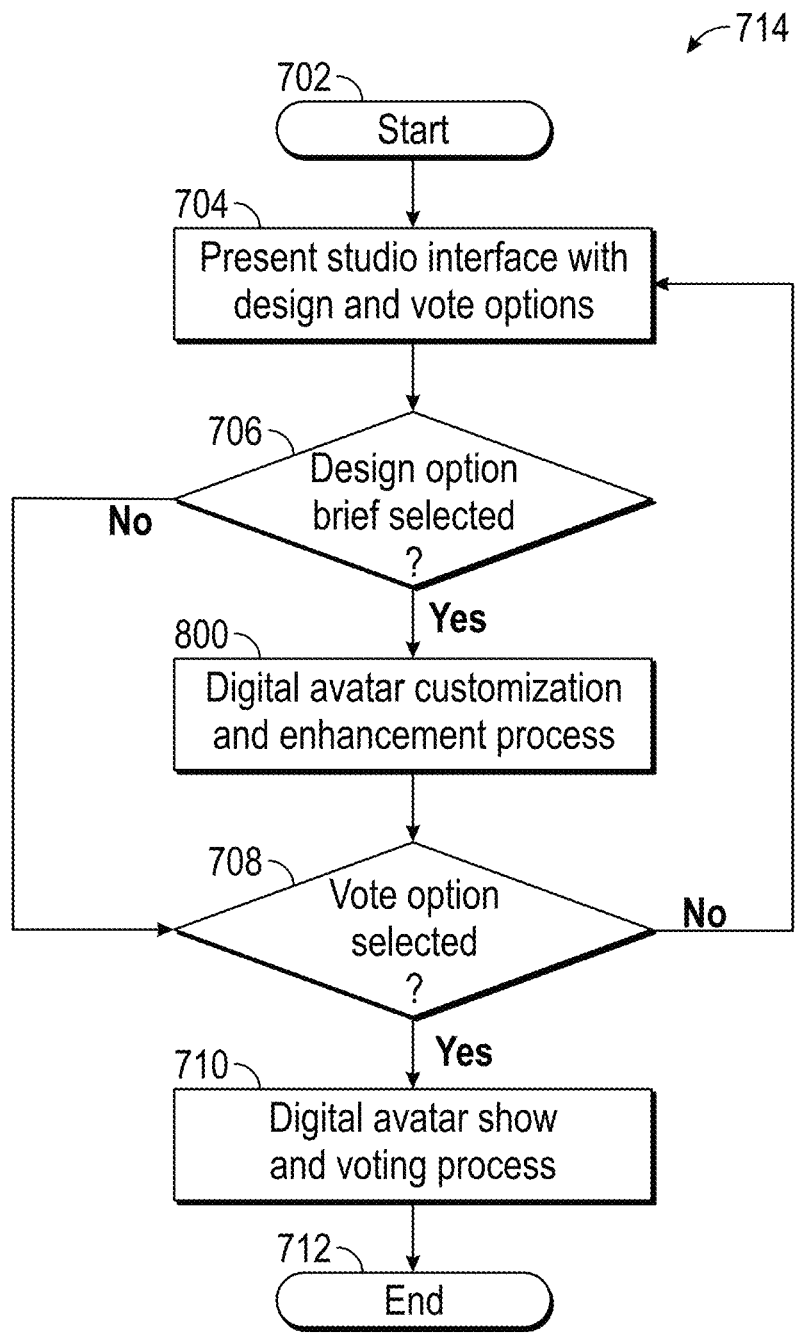
FIG. 7 is a flowchart illustrating a method to facilitate a digital avatar fashion show, in accordance with some examples.

FIG. 7 is a flowchart illustrating a computer-implemented method 714, according to some examples, of implementing a flow for a virtual competition in the example form of a virtual fashion design competition, supported by the fashion design game 416. The method 714 commences at start block 702 by user invocation of the fashion design game 416 within the context of the interaction client 304. The game system 412 operatively supports the execution of the fashion design game 416.

From block 702, the method 714 progresses to block 704, where the game system 412 causes presentation, for example, on a user interface of the interaction client 304 executing on a client device 302, of a studio interface that includes design and show/vote options.

Figure 10:
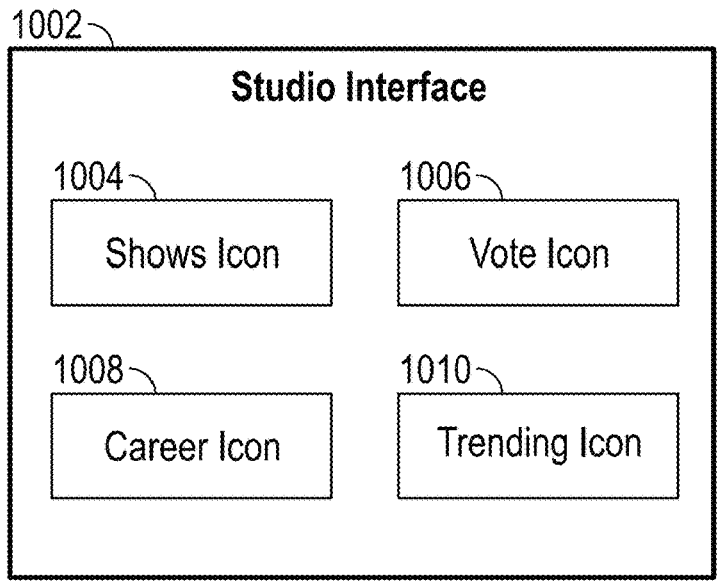
FIG. 10 is a user interface diagram showing a studio interface, according to some examples.

FIG. 10 is a user interface diagram showing an example studio interface 1002, which may be presented, at block 704, by the game system 412 and specifically the fashion design game 416 operating within the context of the interaction client 304. The studio interface 1002 is shown to include a design option in the form of a shows icon 1004, a vote option in the form of a vote icon 1006, a career information option in the form of a career icon 1008, and a trend information option in the form of a trending icon 1010.

Returning to the method 714, a determination is made that decision block 706 as to whether the design option (e.g., the show brief option) has been selected via the studio interface 1002 by a player of the fashion design game 416. Following a positive determination at decision block 706, the method 714 progresses to a design process 800, where the digital avatar customization and enhancement process is initiated, as will be described with reference to subsequent figures.

On the other hand, following a negative determination at decision block 706, a determination is made that decision block 708 as to whether the vote option, presented within the studio interface 1002 at block 704 has been selected by a player of the fashion design game 416. If not, the method 714 circles back to block 704. On the other hand, if the vote option it is determined to have been selected at decision block 708, the method 714 progresses to a digital avatar show and voting process at block 710, where after the method 714 terminates at end block 712.

Figure 11:
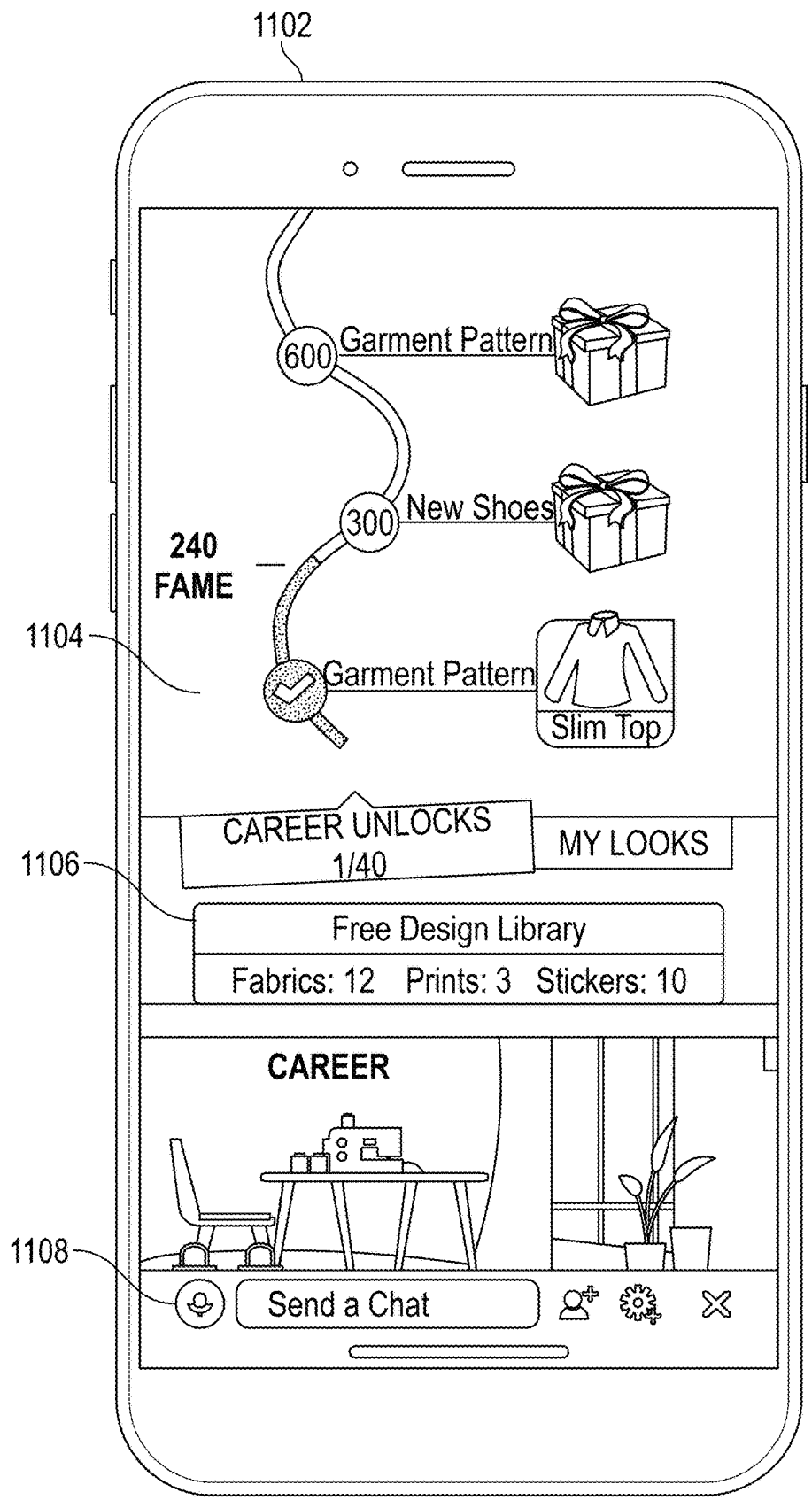
FIG. 11 is a user interface diagram, illustrating a user interface, in accordance with some examples.

Outside of the method 714, a player of the fashion design game 416 may also select the career icon 1008 within the studio interface 1002, which invokes and causes the presentation of a career interface 1102, as shown in FIG. 11. The career interface 1102 includes a career unlocks portion 1104, which displays the progress of a fashion design career of a player, as well as a design library portion 1106, which provides information regarding a design library available to the relevant player. The design library may include augmentations, for example, fabrics, prints, and stickers that are available to the player with which to enhance and customize an avatar or garment associated with a particular avatar. The career interface 1102 also includes a chat interface 1108 using which a player of the fashion design game 416 can invoke the described messaging functionality of the interaction client 304 to send and receive messages from other users of the interaction system 300.

Figure 8:
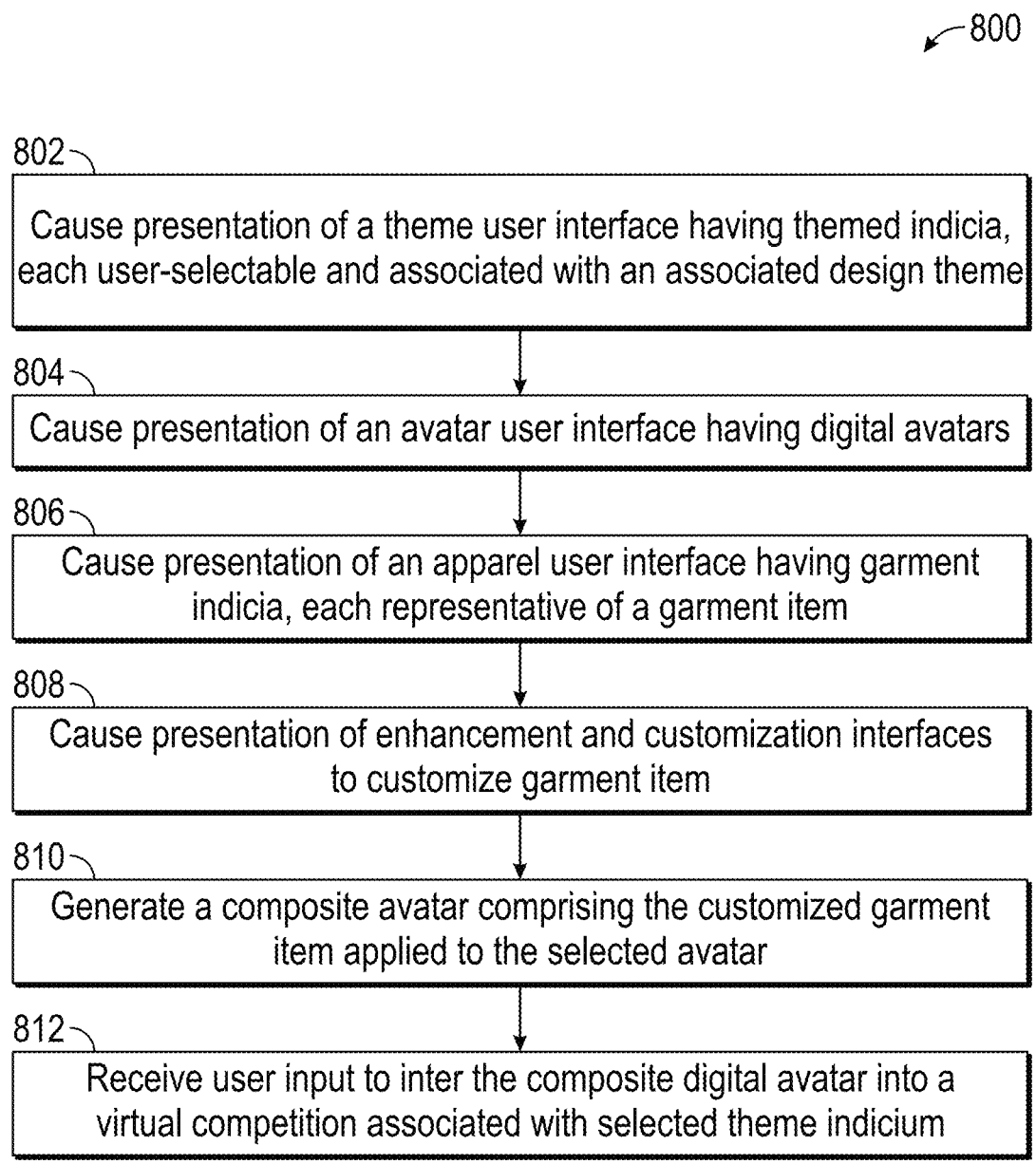
FIG. 8 is a flowchart illustrating a design process, in accordance with some examples.

FIG. 8 is a flowchart depicting a computer-implemented design process 800 of the digital avatar customization, augmentation, and enhancement process discussed with respect to FIG. 7. The design process 800 may be at least partially implemented by the fashion design game 416, executing on a combination of the application servers 314 and the interaction clients 304, supported by the game system 412 depicted in FIG. 4.

Figure 12:
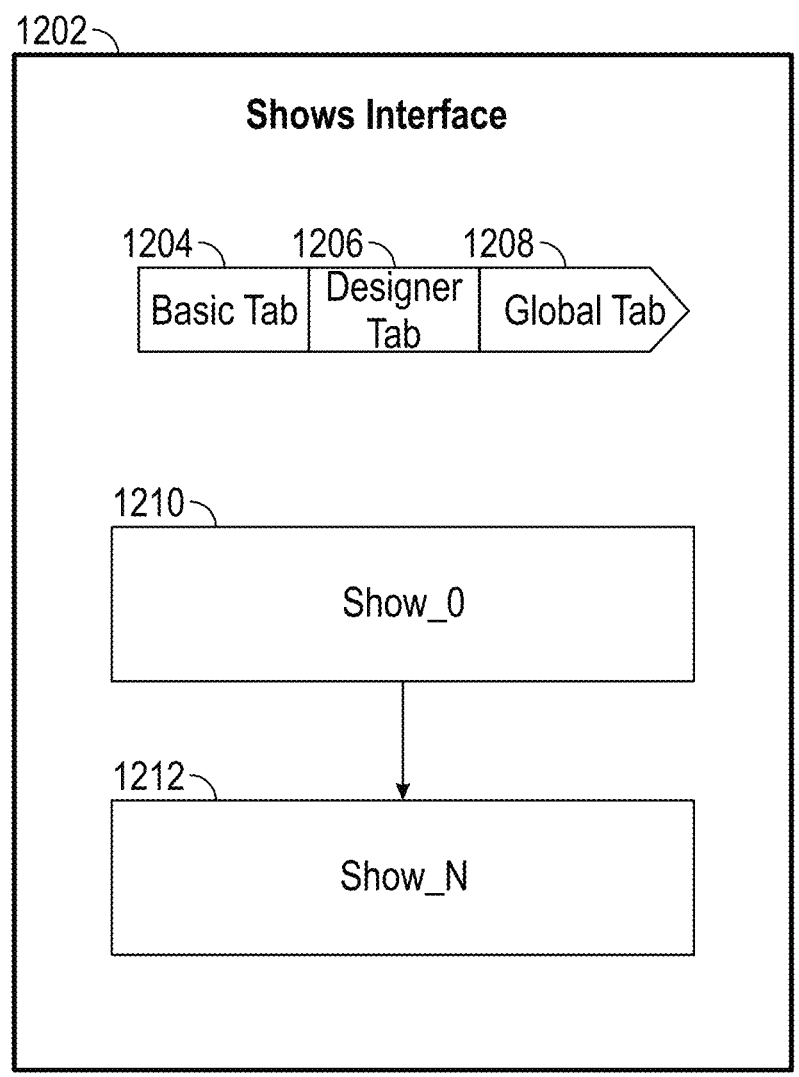
FIG. 12 is a user interface diagram, illustrating a user interface, in accordance with some examples.

The design process 800 commences at block 802, with the fashion design game 416 causing presentation of a theme user interface having multiple theme indicium, each of the themed indicia being user-selectable and associated with a respective design theme. In some examples, the theme user interface is a shows interface 1202, an example of which is shown in FIG. 12 and which is presented responsive to user selection of the shows icon 1004 of the studio interface 1002.

The shows interface 1202 includes a sequence of tabs depicting a show or a runway visual progression from a basic tab 1204 associated with a basic runway show, to a designer tab 1206, associated with a designer runway show, and to a global tab 1208, associated with a global runway show. Each of the basic, designer, and global runway shows has a unique runway environment that represents an upgrade from the previous runway environment. The tab associated with the level or tier of a runway show for which a particular player has qualified is highlighted within the shows interface 1202.

Figure 13:
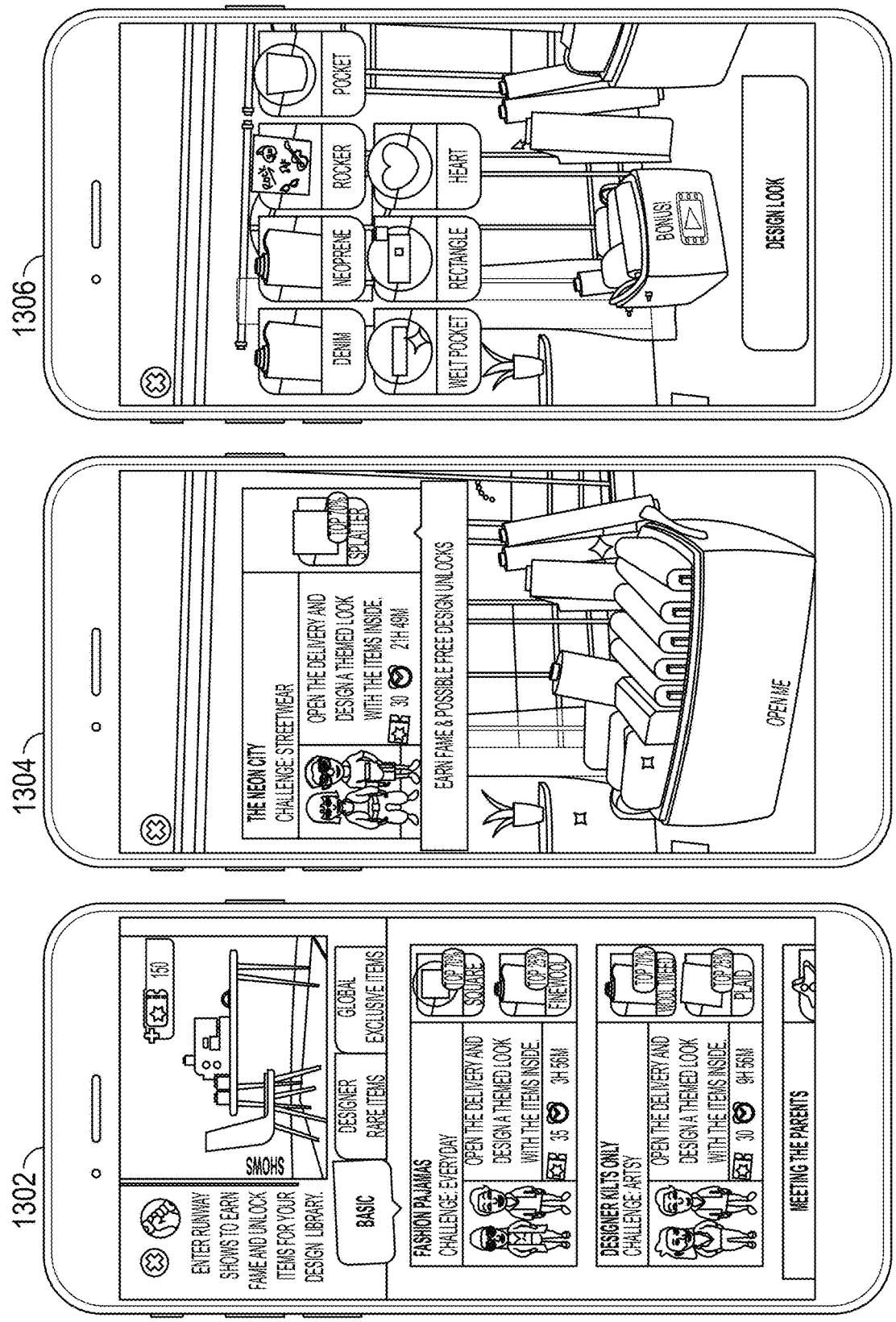
FIG. 13 is a user interface diagram, illustrating user interfaces, in accordance with some examples.

In addition to the runway show types, the shows interface 1202 includes a set of indicium associated with a set of runway or fashion shows at the show level achieved by the player. For example, the show indicium 1210 may be associated with a "neon" design theme, and the show indicium 1212 associated with a "meeting the parents" theme, with each of these themes being associated with one of the show level tabs also highlighted in the interface. FIG. 13 illustrates a further example of a shows interface 1302 displaying three fashion show level tabs, with the "basic" tab highlighted, and a scrollable list of theme indicium shown below that include "fashion pajamas" indicium, a "designer kilts only" indicium, and a "meeting the parents" show indicium.

It should also be noted that runway fashion shows within the context of the fashion design game 416 may be of different types, for example, a "challenge" type and a "free design" type. Shows in these two main types are then split over three tiers of progression, namely basic, designer, and global. As discussed above, each of these tiers has a distinct visual style of runway. The "challenge" runway shows restricted a player to designing for the theme associated with the show, using only items (e.g., garments and accessories) that are made available to the relevant player by the fashion design game 416. As such, challenge type runway fashion shows require players to design for a theme using a restricted set of customization or augmentation items, with each player entering a common challenge and being presented with exactly the same set of customization items. This game mechanic challenges players to use the provided set of customization items in a creative way in order to differentiate over other players.

FIG. 13 shows an example item delivery interface 1304, which is presented responsive to user selection of a show indicium within the shows interface 1302 (e.g., the "neon city" show indicium). Within the item delivery interface 1304, user selection of the "open me" graphic results in the display of the item delivery interface 1306, indicating a set of items e.g., fabrics, prints, and overlays) associated with the "neon city" theme and that are available to the player for use in the fashion design game 416. After the main item delivery has been opened, a player can further elect to watch an advertisement and opening a "bonus delivery", which contains one extra item that the player can use in avatar customization.

Free design type fashion shows are less restrictive than challenge type fashion shows, and offer a player a different way to play. While a design library for a particular player will start out being populated by a basic set of customization items (e.g., fabrics, prints, and overlays) and grow larger and more diverse as a player unlocks additional items, a player is able to unlock additional customization items for his or her design library by completing shows.

Each challenge and free design fashion show has, as noted above, a specific theme. Players are provided with the freedom to interpret and design an outfit for a digital avatar that they believe most accurately meets the theme and is most likely to garner votes in a competition. Some example themes include:

Streetwear
Activewear
Everyday
Punk Rock
Military Inspired
Formal
Vintage Retro
Artsy
Chic Look
High Fashion
Special Event (for holiday, and other special events like Halloween)

Returning to FIG. 8, at block 802 of the design process 800 shown in FIG. 8, responsive to detection of a selection of a selected theme indicium associated with that a selected theme (e.g., the "neon city" theme indicium from within the shows interface 1302 associated with the "neon city" theme), the fashion design game 416 automatically selects options for customization items (e.g., garments, fabrics, prints, stickers, and other overlays) that may be presented to a player in subsequent design step interfaces.

At block 804, the fashion design game 416 causes the presentation of an avatar user interface to a player. The avatar user interface includes a number of digital avatars, each of which is user-selectable as a three-dimensional runway model digital avatar for enhancement and customization using customization items.

Figure 14:
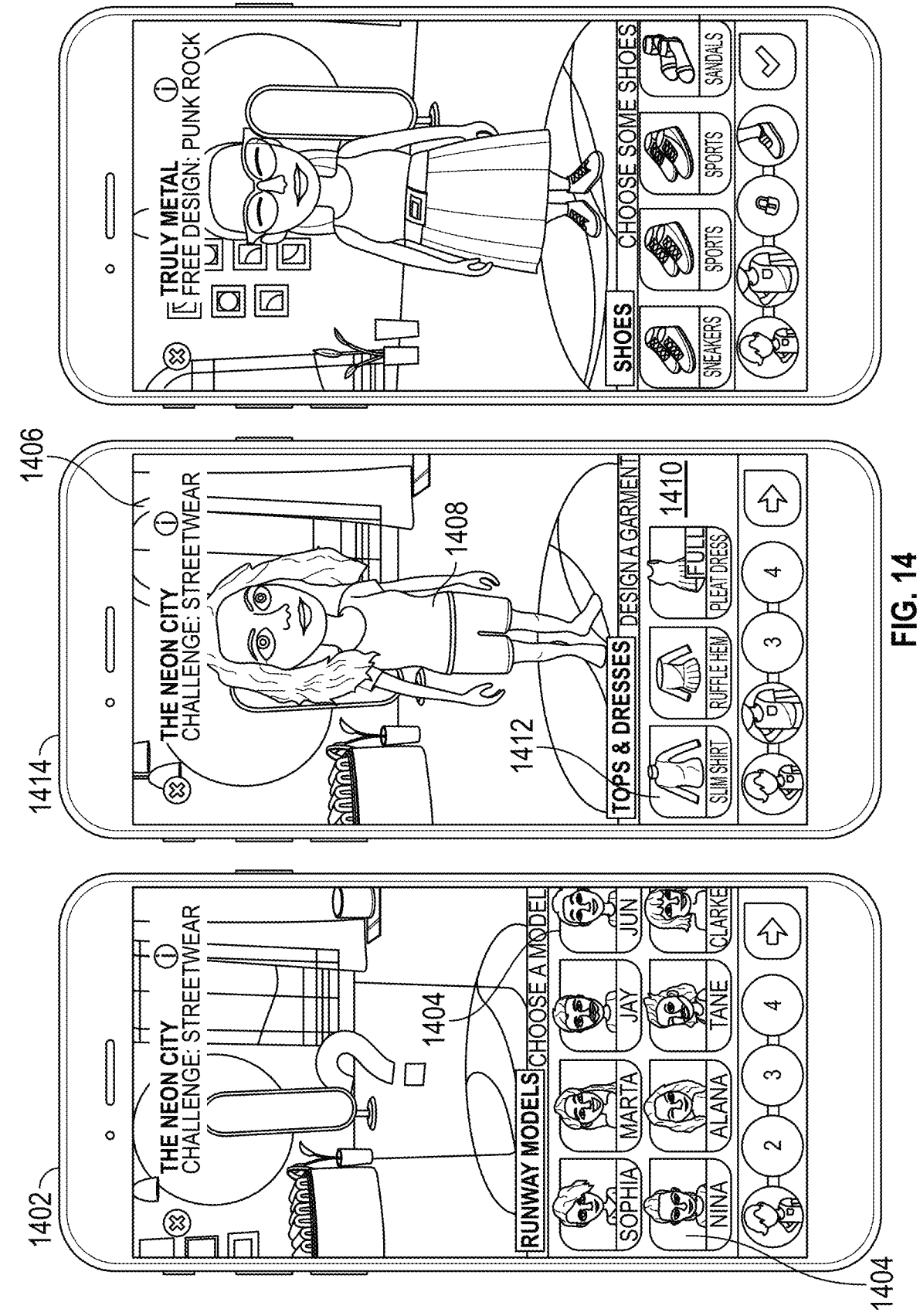
FIG. 14 is a user interface diagram, illustrating user interfaces, in accordance with some examples.

FIG. 14 is a user interface diagram illustrating a model user interface 1402, which is an example of an avatar user interface. The model user interface 1402 includes a set of model indicia 1404, with each model indicium 1404 being associated with a specific model digital avatar. Each of the model indicium 1404 is user-selectable, and the set allows a player to select from multiple different runway model digital avatars to "wear" a digital design. The set of model indicium 1404 is presented as a simple list within the model user interface 1402, and this list is randomly sorted each time it is shown. The displayed set of digital models represent a diversity of race and gender, as well as body types for user selection. Returning to FIG. 6, avatar model data 604 is maintained for each of the displayed model indicium 1404, and comprises a three-dimensional mesh representation of the avatar.

Returning to the design process 800, at block 806, subsequent to detection of a selection of a selected digital avatar, the fashion design game 416 causes presentation of a garment user interface, having multiple garment indicium, each of these indicium being user-selectable and representative of an associated garment item.

FIG. 14 shows an example garment user interface 1414, which is split into a model portion 1406 showing a selected model digital avatar 1408, and a garment portion 1410 displaying a selection of garment indicium 1412, each of which is user selectable to apply an associated garment item (e.g., a slim shirt) to the model digital avatar 1408. Garment selection, using the garment user interface 1414, provides players with an intuitive way of selecting different base garment types that the player can then further customize. Garment items come in four types, namely, full-body, top, bottom, and shoe types. Top and full-body garments are sorted in a common list. Full-body outfits are provided with a lock indicator to show that the player will not be able to select a bottom garment while the model digital avatar 1408 is wearing the full-body outfit. Further, each of these garment types, with the exception of shoes, can be modified using the design tools discussed herein.

Figure 9:
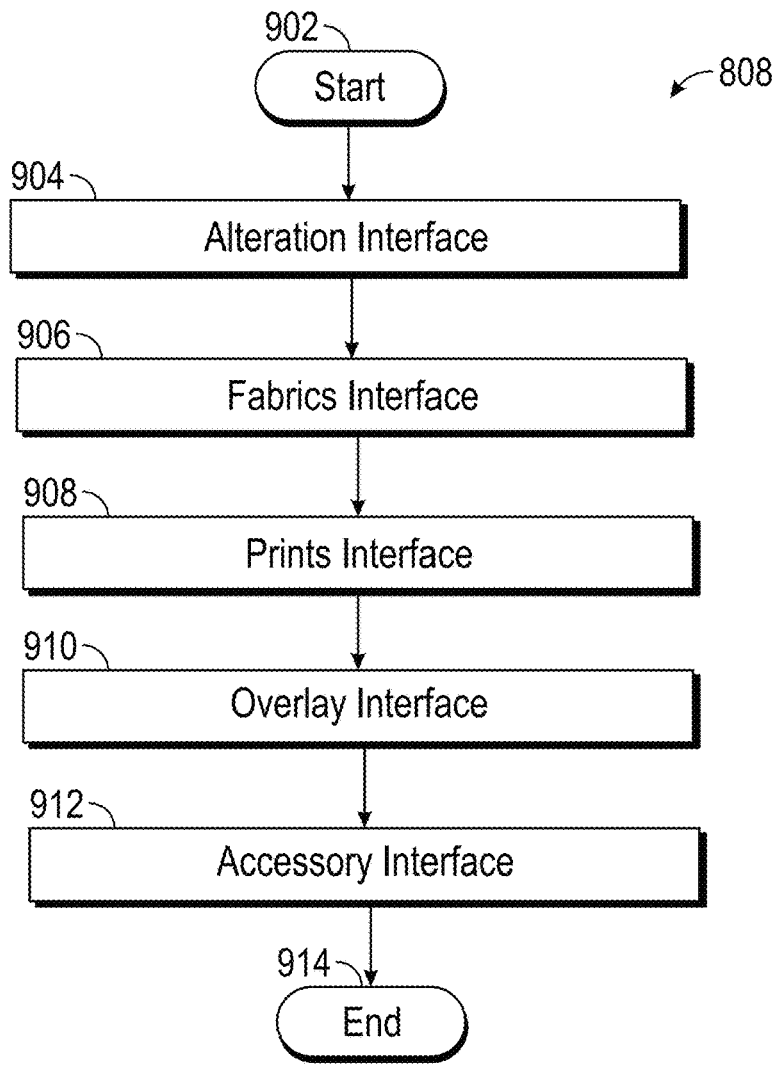
FIG. 9 is a flowchart illustrating a sequence of interfaces that may be presented as part of the presentation of enhancement and customization user interfaces of customization operations, in accordance with some examples.

Returning back to the design process 800 shown in FIG. 8, as part of the customization operations 8088, the fashion design game 416 causes the presentation of a number of enhancement and customization interfaces, using which a player can customize and enhance the selected garment item that has been applied to the model digital avatar. FIG. 9 illustrates a sequence of these interfaces, which will be further discussed with reference to FIG. 9 onward.

Having completed enhancement and customization of a selected garment item, or garment items, as applied to a model digital avatar, at block 810, the fashion design game 416 generates a composite avatar comprising the customized garment item, or items, as applied to the selected model digital avatar. FIG. 20 shows an example of a model user interface 2002, in which an example composite digital avatar 2006 is shown.

At block 812, the fashion design game 416 then receives user input in order to enter the composite digital avatar into a virtual competition (e.g., a runway fashion show) of the selected theme. User interface 2002 shows an "enter show" icon 2008 using which a player can provide the mentioned user input to enter the model digital avatar, two, 304 into a digital fashion show.

FIG. 9 is a flowchart illustrating a sequence of interfaces that may be presented as part of the presentation of enhancement and customization user interfaces of customization operations 808 of FIG. 8. Subsequent to the selection of a garment item, using the garment user interface, the customization operations 808 commences at start block 902, and progresses to the presentation of an alteration interface at block 904 within which dimensions of one or more selected garment items are adjustable by a player to generate a customized garment item.

Figure 15:
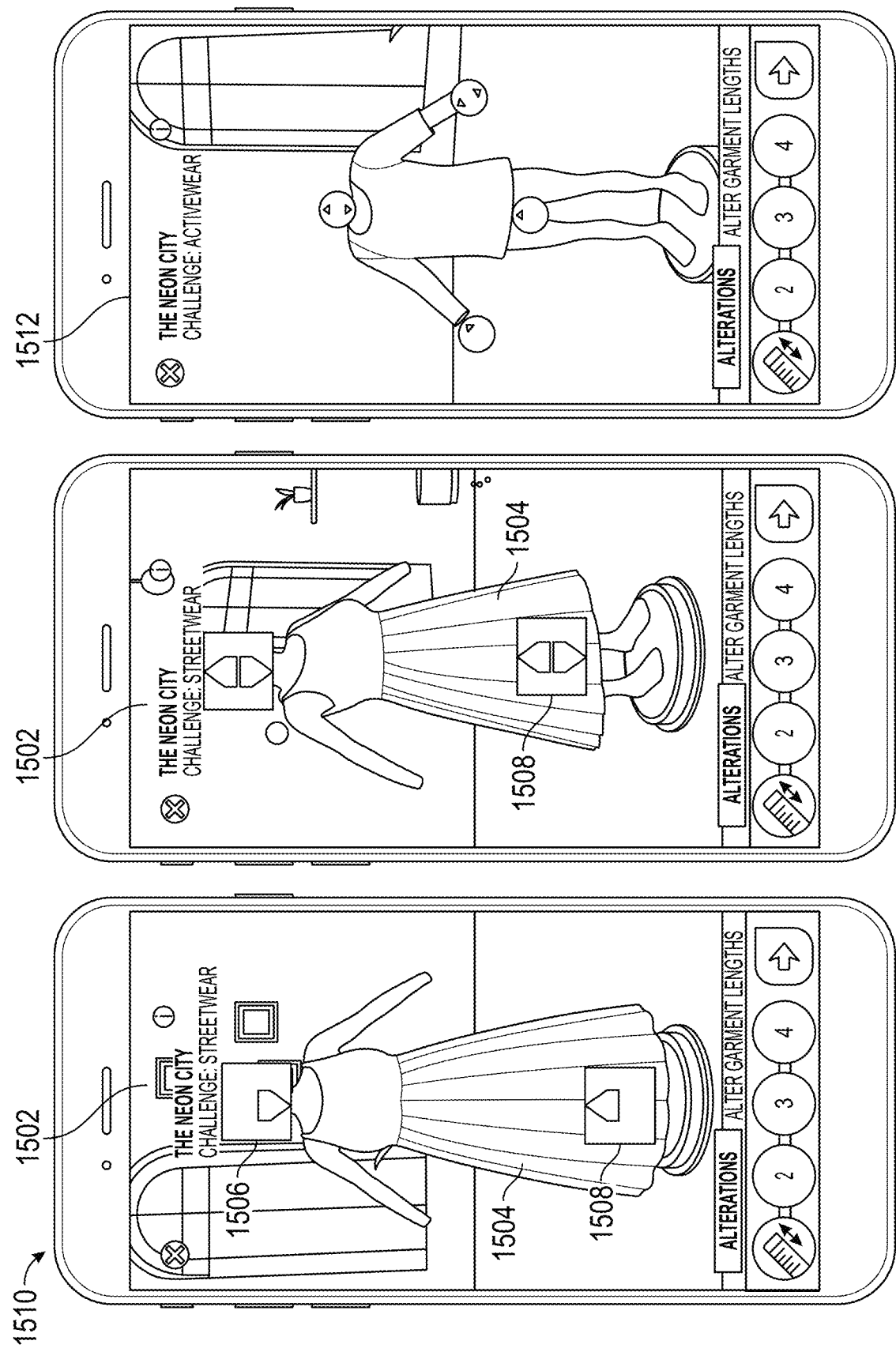
FIG. 15 is a user interface diagram, illustrating user interfaces, in accordance with some examples.

FIG. 15 shows screenshots 1502 of an example alteration user interface 1510. A garment item in the form of a dress 1504 is shown to have a neckline that is alterable by a first alteration icon 1506, while the lower hem of the dress 1504 is alterable by a second alteration icon 1508. Each of the alteration icons includes an arrow or other direction indicator indicating a direction in which the dimensions of the dress 1504 can be altered. For example, within the screenshot 1502, the first alteration icon 1506 includes only a downward arrow, indicating that the dress neckline can be lowered but not raised in the current state of the dress. Similarly, the second alteration icon 1508 includes an upward arrow or direction indicator, indicating that the hemline of the dress may only be raised in the current state of the dress.

Having lowered the neckline and raised the hemline, a second screenshot shows a second state of the dress 1504 is shown in the screenshot 1502. Here, a first alteration icon 1506 includes both up and down direction indicators, indicating that, in this second state in which the user previously lowered the neckline of the dress 1504, the user now has the option of further lowering the neckline or raising it. Similarly, two direction indicators or arrows within the second alteration icon 1508 indicate that, in this second state, the hemline of the dress may be raised or lowered.

In other examples, alteration icons may include other direction indicators (e.g., arrows) at a specific points, or locations with respect to a digital garment item, indicating a directions in which the garment may be altered when in a specific state. For example, alteration icons may be placed at or adjacent the free ends of sleeves of a garment item, as shown in screenshot 1512, to indicate that the sleeves may be either shortened or lengthened blend, depending on the state of the digital garment item.

Returning to FIG. 9, at block 906, the fashion design game 416 causes the presentation of a fabric user interface that includes a fabric indicia, each of which is user selectable and representative of an associated fabric type. The fashion design game 416 may also detect user selection of a selected fabric indicium, associated with a selected fabric type, within the fabric user interface, and apply the selected fabric type to the selected garment item.

FIG. 16 shows the two screenshots 1602 of an example fabric user interface 1610. The example fabric user interface 1610 includes a garment portion 1604 and a fabric choice portion 1606. Within the fabric choice portion 1606, a selection of fabric indicium is shown (e.g., a denim fabric indicium and a neoprene fabric indicium). User selection of the neoprene fabric indicium 1608 within the fabric user interface 1610 will cause the selected neoprene fabric type to be applied to the garment. Additionally, the selected fabric indicium (e.g., the fabric indicium 1608) is visually differentiated within the fabric choice portion 1606 to indicate which fabric selection has been applied to the garment displayed within the garment portion 1604.

At block 908 of FIG. 9, the fashion design game 416 causes the presentation of a print user interface, having multiple print indicia, each of which is user selectable and representative of an associated print. The user selection of a selected print indicia, associated with a selected print, is detected, and the selected print is applied to the selected garment item.

Figure 17:
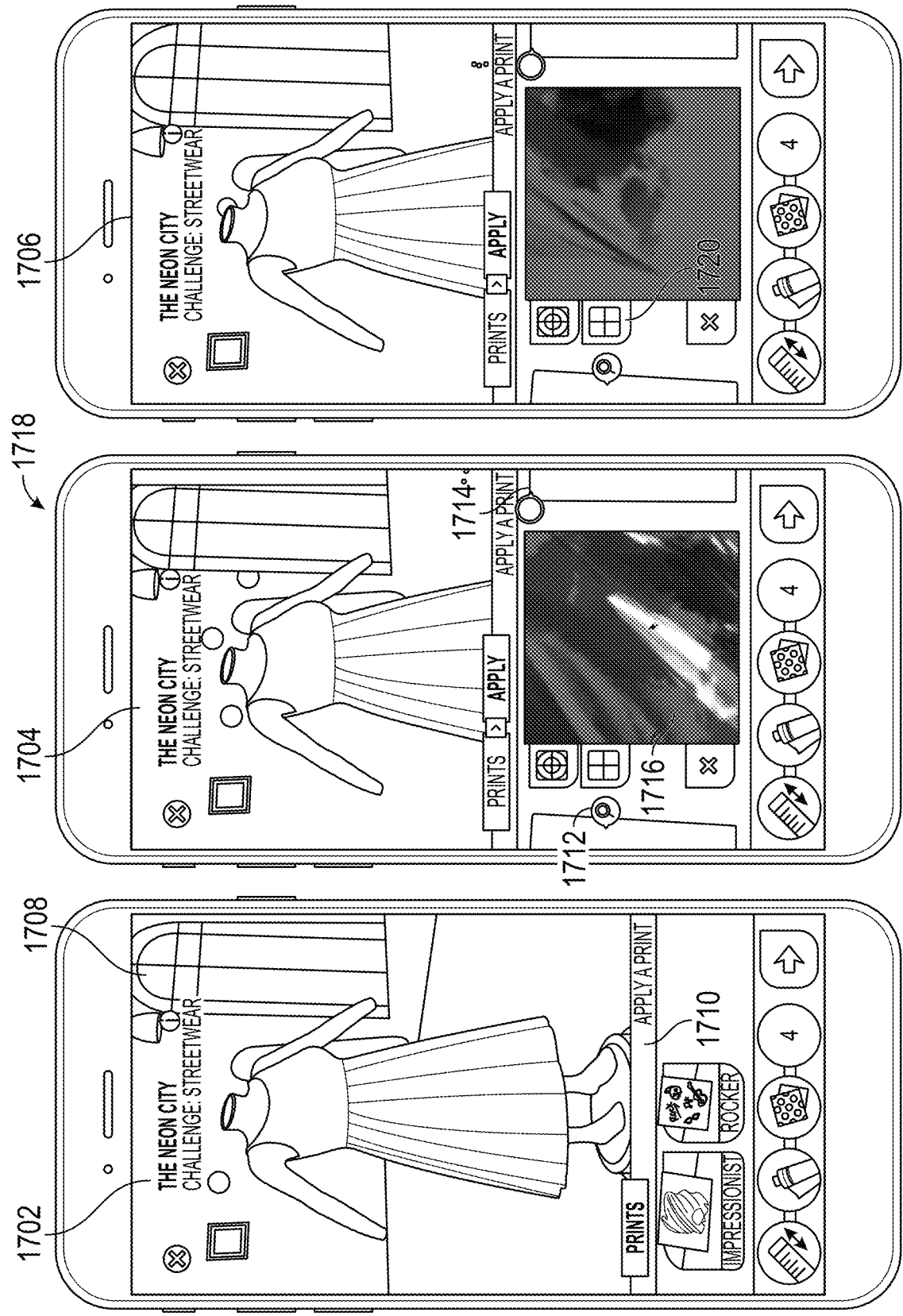
FIG. 17 is a user interface diagram, illustrating user interfaces, in accordance with some examples.

FIG. 17 shows screenshots of an example print user interface 1718. The print user interface 1718 includes two portions, namely a first garment portion 1708 showing a representation of a selected garment, and second print portion 1710, which presents various design options and mechanisms related to a print to be applied to a garment shown in the garment portion 1708. In the first screenshot 1702. the print portion 1710 is shown to include a number of print indicia, each representative of an associated print (e.g., an "impressionist" print and a "rocker" print), each of these indicia being user-selectable to apply the associated print to the selected garment. In the example shown in FIG. 17, the "impressionist" print indicia is selected, which results in an application of this print as a selected print to the garment, as depicted in screenshot 1704.

Upon application of the selected print, and as shown in the screenshot 1704, the print portion 1710 is modified to present both an image zoom slider 1712, and a color slider 1714. The zoom slider 1712 enables a user to magnify and de-magnify a portion of the print shown in a print stamp window 1716. The image portion shown in the print stamp window 1716 is effectively replicated across the selected garment. Accordingly, by zooming into, or zooming out of, an overall print design to modify the image portion shown in the print stamp window 1716, a user is able to modify which portion of an overall print is applied to the selected garment, and also the magnification of that portion of the overall print. Consider that, in the screenshot 1706, a different portion of the overall "impressionist" print is selected and zoomed into within the print stamp window 1716. This results in a different portion of the overall print being replicated across the selected garment, as is apparent from the screenshot 1706. By enabling a user to select different portions of an overall design within the print stamp window 1716 to be applied and replicated across the garment, and also to modify the magnification of the selected portion of the overall print design, a wide variety of design options are open to the player. Further, by adjusting the color slider 1714, a player can conveniently change the color of the print.

The print user interface 1718 also presents tiling buttons 1720 of different tiling type buttons that change the way a print is tiled. Example types 1802. are shown in FIG. 18, these types 1802 being defined in the fabric print data 614 and varying depending on the print. This will give artists control over what tiling looks best, and creates the most options, per print.

Returning to the customization operations 808 shown in FIG. 9, at block 910, the fashion design game 416 causes the presentation of a design overlay user interface, this interface having and presenting multiple overlay indicium. Each of these overlay indicia, in turn, is user-selectable and representative of an associated overlay. User-selection of a selected overlay indicia, associated with a selected overlay, is detected, and the selected overlay is applied to the selected garment item.

At block 912, the fashion design game 416 causes the presentation of an accessory interface, this interface having and presenting multiple accessory indicium. Each of these accessory indicia, in turn, is user-selectable and representative of an associated overlay. User-selection of a selected accessory indicia, associated with a selected accessory, is detected, and the selected accessory is applied to the selected garment item.

Figure 19:
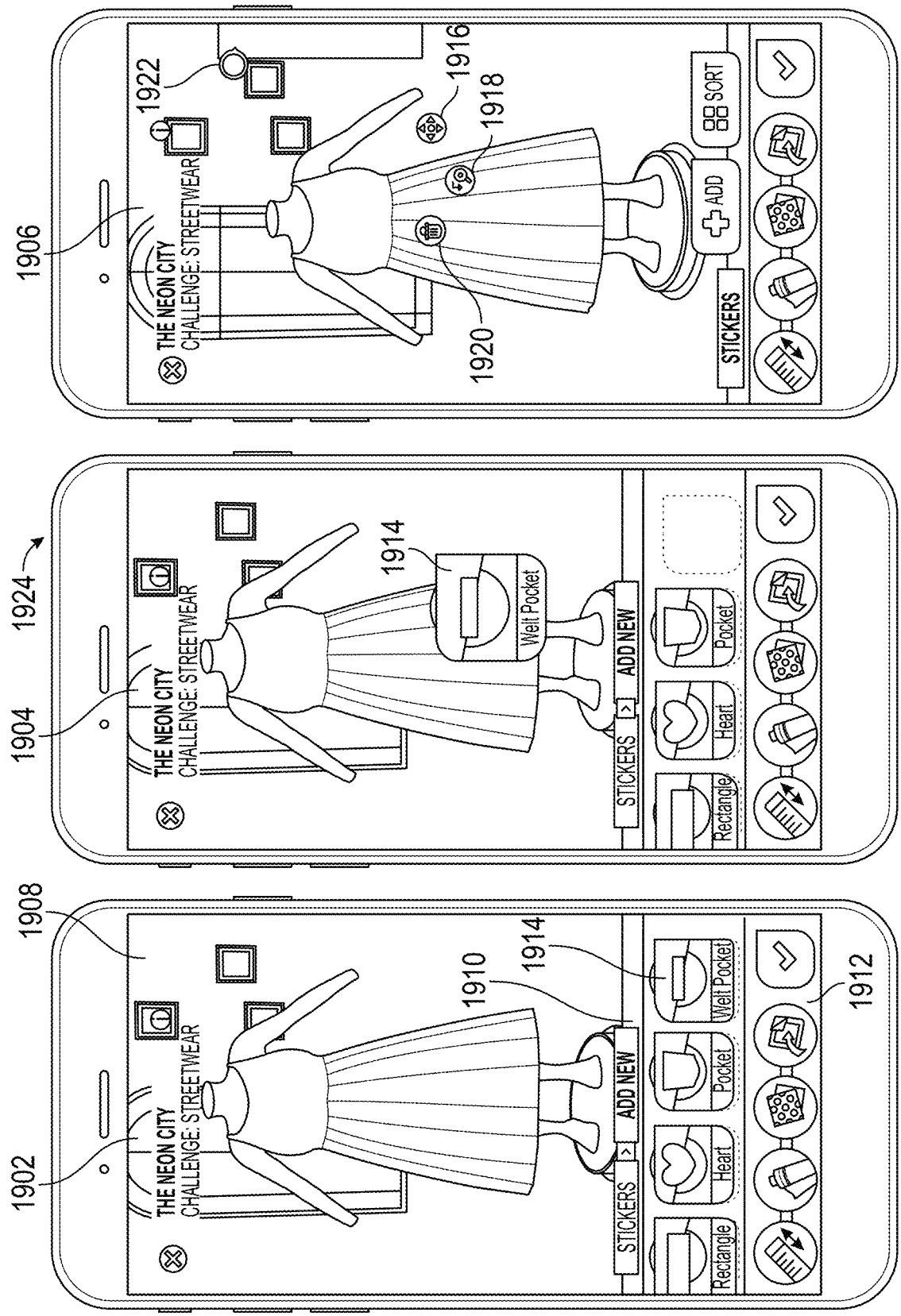
FIG. 19 is a user interface diagram, illustrating user interfaces, in accordance with some examples.
Figure 21:
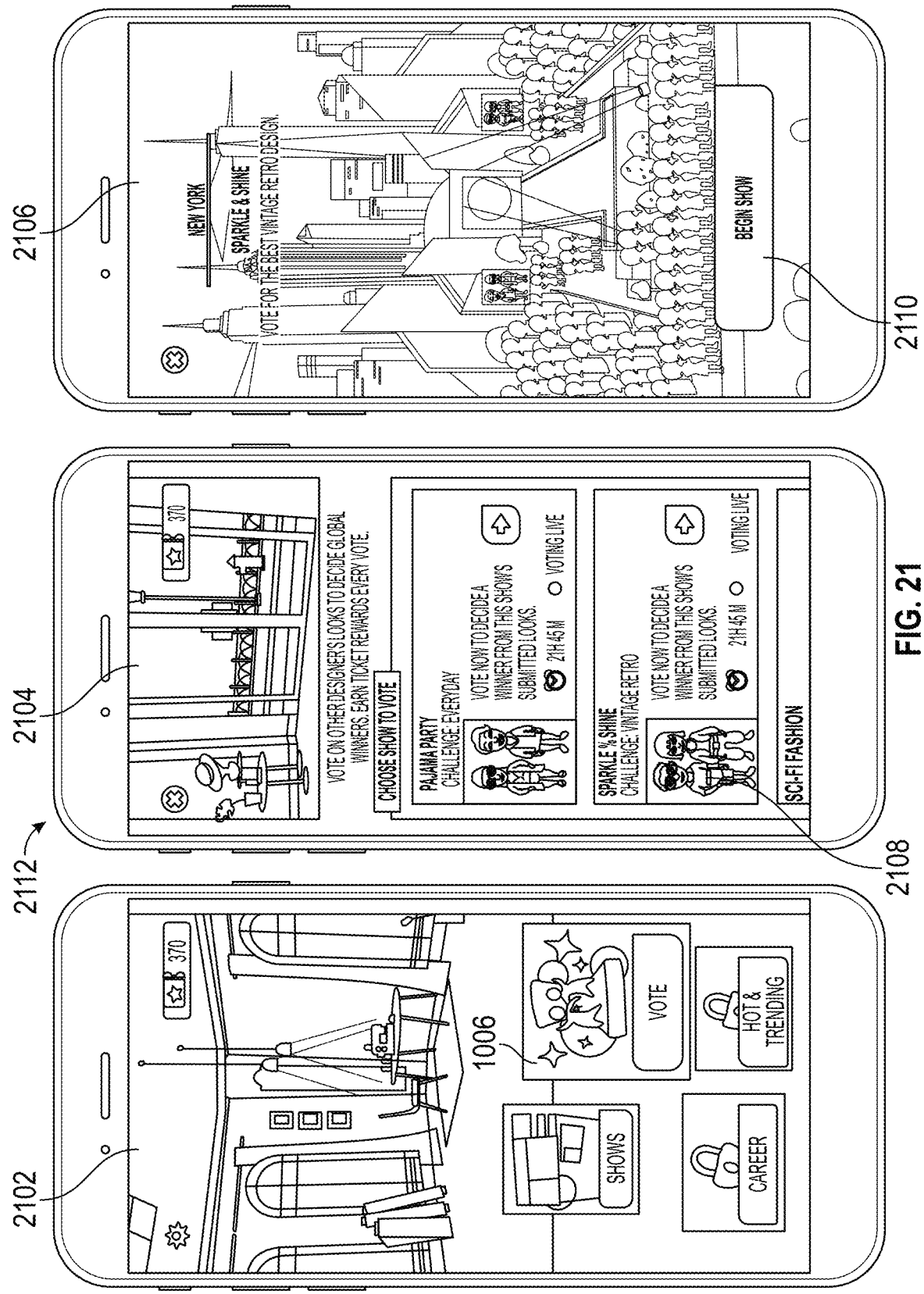
FIG. 21 is a user interface diagram, illustrating user interfaces, in accordance with some examples.

FIG. 19 shows a number of screenshots of a design overlay user interface, in the example form of a sticker user interface 1924. The sequence of screenshots shows application of an overlay, in the example form of a sticker representing a design item, to a customized digital garment for a model digital avatar. The sticker user interface 1924 includes:

a garment portion 1908, depicting a selected digital garment, a sticker portion 1910 showing a set of overlays, the example form of stickers, that can be applied to the digital garment, and a navigation portion 1912 showing a player's progress within a design process. The navigation portion further enables the player to navigate between various steps or operations in the design process for a digital garment to be applied to a model digital avatar.

In the screenshot 1902, the selected digital garment is shown to have a print applied thereto, and the player can now select from the set of stickers shown in the sticker portion 1910 to apply to the garment. Screenshot 1904 shows user selection of a "welt pocket" sticker 1914, which is then selected within the sticker portion 1910 and dragged to the garment portion 1908 of the sticker user interface 1924. As shown in screenshot 1906, the sticker user interface 1924 then presents a number of tools, using which the player can move, rotate, and scale the selected sticker. Specifically, a move icon 1916 can be used to move the selected sticker with respect to the digital garment, a rotate icon 1918 can be used to rotate and scale the selected sticker, and a trash icon 1920 can be used to delete the selected sticker.

Further, the sticker user interface 1924 as shown within the screenshot 1906, includes a color slider 1922 that presents a gradient list of possible colors that a player can use to dye or color of a sticker being added to the digital garment. The color slider 1922 is only presented and visible when a sticker is selected, and functions in a similar manner to the fabric and print color sliders. The color slider 1922 allows the player to recolor a sticker based on the presented color gradients within the color slider 1922. The presented color gradient may be applicable to only a specific sticker or stickers. For example, for buckles and clasps, the available color gradients may be restricted to metallic Hughes.

The customization operations 808 then terminate at done block 914. It will be appreciated that the navigation portion 1912 presented in the various user interfaces discussed above may allow a user to jump between the various interfaces discussed, and return to a previous interface to modify, for example, a fabric choice or print, and to add additional overlays (e.g., stickers) to a digital design garment.

FIG. 10 is a user interface diagram showing a studio interface 1002, according to some examples. Included in the studio interface 1002 is a shows icon 1004, a vote icon 1006, a career icon 1008, and a trending icon 1010. The shows icon 1004 is user-selectable to invoke a shows interface 1202, while the vote icon 1006 is user-selectable to invoke the vote mechanism 108 by which a player can view shows that are currently ongoing, and vote for customized digital avatars having designed outfits. The career icon 1008 is user selectable to invoke a career interface 1102, and the trending icon 1010 is user selectable to invoke trend data.

Returning to the digital avatar show and voting process 1210 shown in FIG. 7, FIG. 21-FIG. 23 show a number of screenshots depicting an example user interface sequence that may be presented to a player by the fashion design game 416.

The screenshot 2102 shows an example studio interface 1002, and depicts user selection of a voter vote icon 1006, which then causes presentation of a vote user interface 2112 depicted in the screenshot 2104. The vote user interface 2112 presents a set of indicia associated with active fashion design shows, from which a player can select a particular show within which to vote. Having selected a particular show (e.g., the "sparkle and shine" show 2108), the vote user interface 2112 presents an introductory screen, depicted in screenshot 2106, which includes a "begin show" icon 2110.

Figure 22:
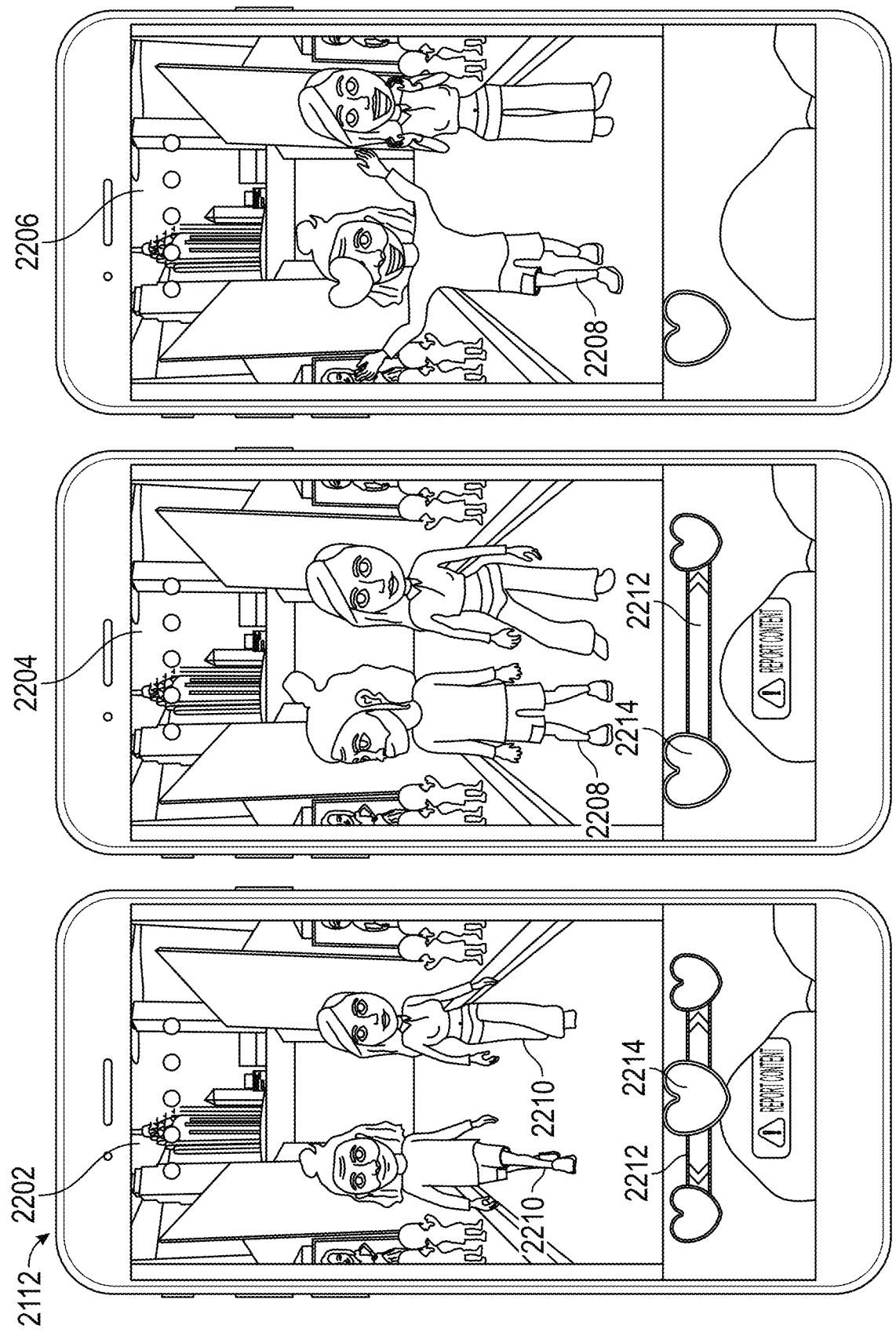
FIG. 22 is a user interface diagram, illustrating user interfaces, in accordance with some examples.

The vote user interface 2112 then presents a runway environment, depicted in the screenshots shown in FIG. 22 that enables a player to view and rate the designs of other players, for example, by voting between a pair of designs shown on the runway at any one time. Screenshot 2202 shows a pair of customized model digital avatars, namely model digital avatar 2208 and model digital avatar 2210, each of which is a composite digital avatar (of a model and a customized garment) advancing down the runway. Using a voting slider 2212, a voting player can cast a vote for either one of the avatars. Specifically, by sliding the selection heart icon 2214 to the left as shown in screenshot 2204, the voting player casts a vote for the avatar 2208. The avatar that received the vote (e.g., the avatar 2208) then performs a celebratory animation sequence, as shown in screenshot 2206.

FIG. 23 shows screenshot 2302 and screenshot 2304 of an intermission, in a show, as may be presented by the vote user interface 2112. By a voting player having cast a vote, the voting player is provided with a reward in the form of tickets, which constitute a reward currency. The accumulation of this currency (e.g., tickets) allows the voting player to use this currency to enter new shows.

DATA COMMUNICATIONS ARCHITECTURE

Figure 24:
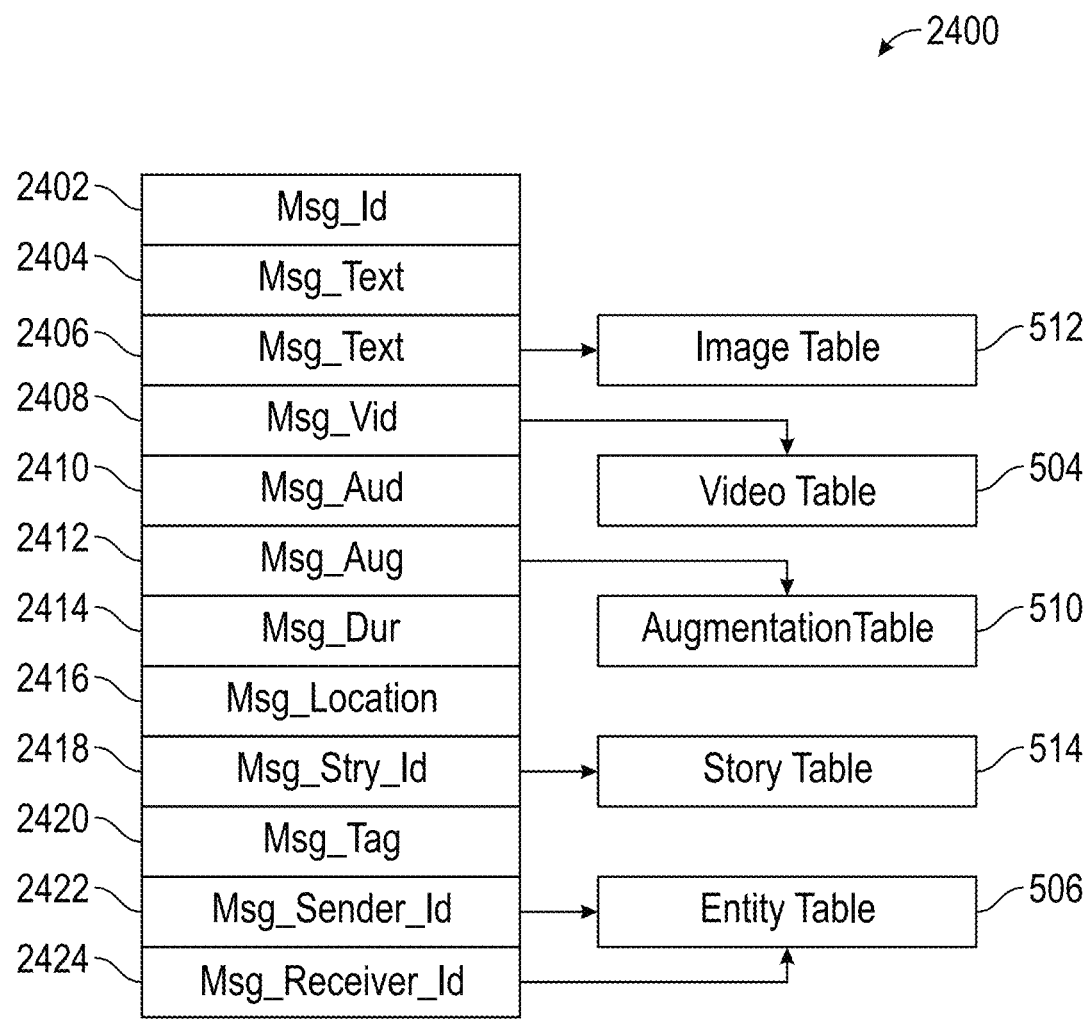
FIG. 24 is a diagrammatic representation of a message, in accordance with some examples.

FIG. 24 is a schematic diagram illustrating a structure of a message 2400, according to some examples, generated by an interaction client 304 for communication to a further interaction client 304 or the interaction server 318. The content of a particular message 2400 is used to populate the message table 502 stored within the database 326, accessible by the interaction server 318. Similarly, the content of a message 2400 is stored in memory as "in-transit" or "in-flight" data of the client device 302 or the application servers 314. A message 2400 is shown to include the following example components:

- message identifier 2402: a unique identifier that identifies the message 2400.
- message text payload 2404: text, to be generated by a user via a user interface of the client device 302. and that is included in the message 2400.
- message image payload 2406: image data, captured by a camera component of a client device 302 or retrieved from a memory component of a client device 302, and that is included in the message 2400. Image data for a sent or received message 2400 may be stored in the image table 512.
- message video payload 2408: video data, captured by a camera component or retrieved from a memory component of the client device 302, and that is included in the message 2400. Video data for a sent or received message 2400 may be stored in the video table 504.
- message audio payload 2410: audio data, captured by a microphone or retrieved from a memory component of the client device 302, and that is included in the message 2400.
- message augmentation data 2412: augmentation data (e.g., filters, stickers, or other annotations or enhancements) that represents augmentations to be applied to message image payload 2406, message video payload 2408, or message audio payload 2410 of the message 2400. Augmentation data for a sent or received message 2400 may be stored in the augmentation table 510.
- message duration parameter 2414: parameter value indicating, in seconds, the amount of time for which content of the message (e.g., the message image payload 2406, message video payload 2408, message audio payload 2410) is to be presented or made accessible to a user via the interaction client 304.
- message geolocation parameter 2416: geolocation data (e.g., latitudinal, and longitudinal coordinates) associated with the content payload of the message. Multiple message geolocation parameter 2416 values may be included in the payload, each of these parameter values being associated with respect to content items included in the content (e.g., a specific image into within the message image payload 2406, or a specific video in the message video payload 2408).
- message story identifier 2418: identifier values identifying one or more content collections (e.g., "stories" identified in the story table 514) with which a particular content item in the message image payload 2406 of the message 2400 is associated. For example, multiple images within the message image payload 2406 may each be associated with multiple content collections using identifier values.
- message tag 2420: each message 2400 may be tagged with multiple tags, each of which is indicative of the subject matter of content included in the message payload. For example, where a particular image included in the message image payload 2406 depicts an animal (e.g., a lion), a tag value may be included within the message tag 2420 that is indicative of the relevant animal. Tag values may be generated manually, based on user input, or may be automatically generated using, for example, image recognition.

message sender identifier 2422: an identifier (e.g., a messaging system identifier, email address, or device identifier) indicative of a user of the Client device 302 on which the message 2400 was generated and from which the message 2400 was sent.

message receiver identifier 2424: an identifier (e.g., a messaging system identifier, email address, or device identifier) indicative of a user of the client device 302 to which the message 2400 is addressed.

The contents (e.g., values) of the various components of message 2400 may be pointers to locations in tables within which content data values are stored. For example, an image value in the message image payload 2406 may be a pointer to (or address of) a location within an image table 512. Similarly, values within the message video payload 2408 may point to data stored within a video table 504, values stored within the message augmentations 412 may point to data stored in an augmentation table 510, values stored within the message story identifier 2418 may point to data stored in a story table 514, and values stored within the message sender identifier 2422 and the message receiver identifier 2424 may point to user records stored within an entity table 506.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

TIME-BASED ACCESS LIMITATION ARCHITECTURE

Figure 25:
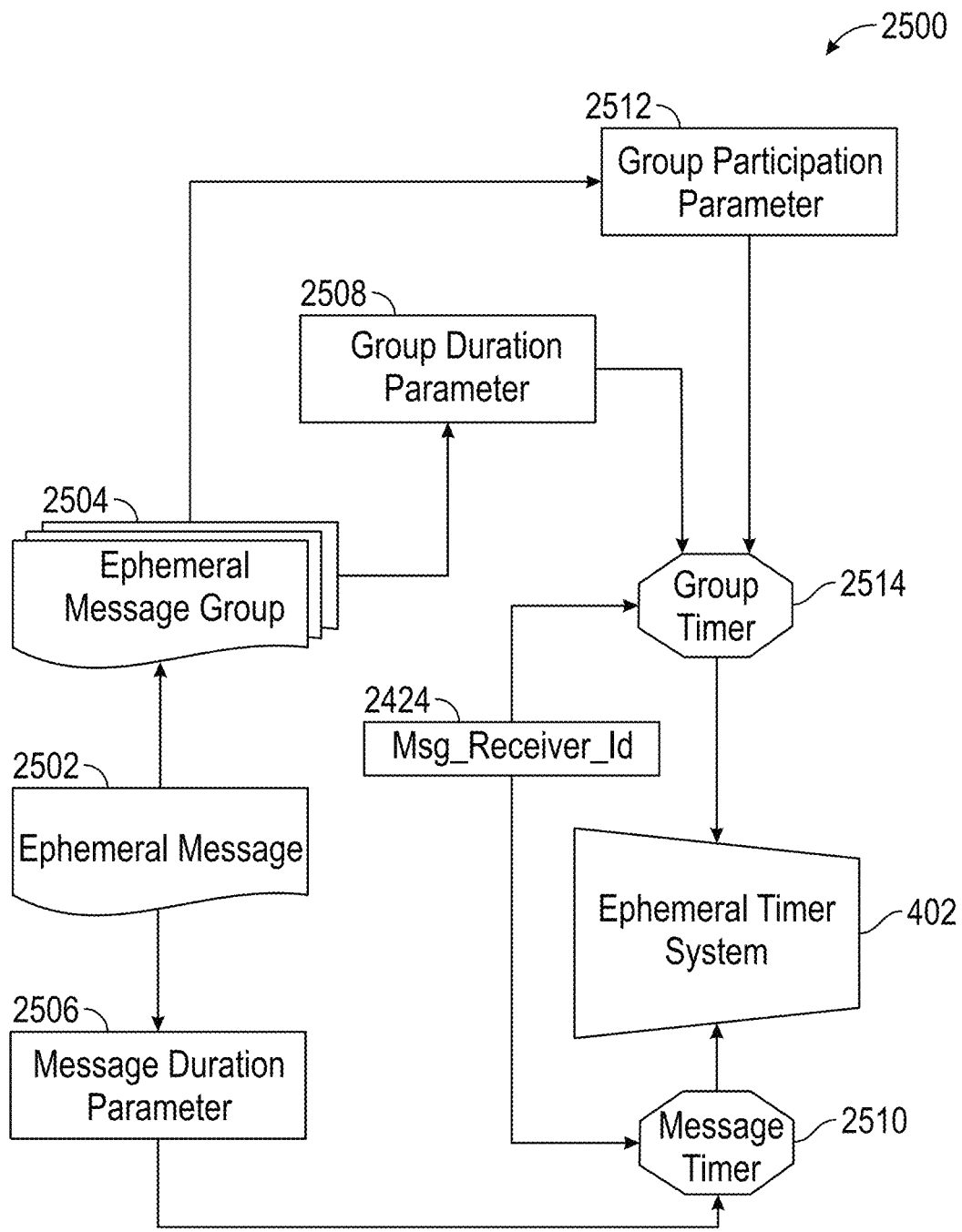
FIG. 25 is a flowchart for an access-limiting process, in accordance with some examples.

FIG. 25 is a schematic diagram illustrating an access-limiting process 2500, in terms of which access to content (e.g., an ephemeral message 2502, and associated multimedia payload of data) or a content collection (e.g., an ephemeral message group 2504) may be time-limited (e.g., made ephemeral).

An ephemeral message 2502 is shown to be associated with a message duration parameter 2506, the value of which determines an amount of time that the ephemeral message 2502 will be displayed to a receiving user of the ephemeral message 2502 by the interaction client 304. In some examples, an ephemeral message 2502 is viewable by a receiving user for up to a maximum of 10 seconds, depending on the amount of time that the sending user specifies using the message duration parameter 2506.

The message duration parameter 2506 and the message receiver identifier 2424 are shown to be inputs to a message timer 2510, which is responsible for determining the amount of time that the ephemeral message 2502 is shown to a particular receiving user identified by the message receiver identifier 2424. In particular, the ephemeral message 2502 will only be shown to the relevant receiving user for a time period determined by the value of the message duration parameter 2506. The message timer 2510 is shown to provide output to a more generalized ephemeral timer system 402, which is responsible for the overall timing of display of content (e.g., an ephemeral message 2502) to a receiving user.

The ephemeral message 2502 is shown in FIG. 25 to be included within an ephemeral message group 2504 (e.g., a collection of messages in a personal story or an event story). The ephemeral message group 2504 has an associated group duration parameter 2508, a value of which determines a time duration for which the ephemeral message group 2504 is presented and accessible to users of the interaction system 300. The group duration parameter 2508, for example, may be the duration of a music concert, where the ephemeral message group 2504 is a collection of content pertaining to that concert. Alternatively, a user (either the owning user or a curator user) may specify the value for the group duration parameter 2508 when performing the setup and creation of the ephemeral message group 2504.

Additionally, each ephemeral message 2502 within the ephemeral message group 2504 has an associated group participation parameter 2512, a value of which determines the duration of time for which the ephemeral message 2502 will be accessible within the context of the ephemeral message group 2504. Accordingly, a particular ephemeral message group 2504 may "expire" and become inaccessible within the context of the ephemeral message group 2504, prior to the ephemeral message group 2504 itself expiring in terms of the group duration parameter 2508. The group duration parameter 2508, group participation parameter 2512, and message receiver identifier 2424 each provide input to a group timer 2514, which operationally determines, firstly, whether a particular ephemeral message 2502 of the ephemeral message group 2504 will be displayed to a particular receiving user and, if so, for how long. Note that the ephemeral message group 2504 is also aware of the identity of the particular receiving user as a result of the message receiver identifier 2424.

Accordingly, the group timer 2514 operationally controls the overall lifespan of an associated ephemeral message group 2504, as well as an individual ephemeral message 2502 included in the ephemeral message group 2504. In some examples, each and every ephemeral message 2502 within the ephemeral message group 2504 remains viewable and accessible for a time period specified by the group duration parameter 2508. In a further example, a certain ephemeral message 2502 may expire, within the context of ephemeral message group 2504, based on a group participation parameter 2512. Note that a message duration parameter 2506 may still determine the duration of time for which a particular ephemeral message 2502 is displayed to a receiving user, even within the context of the ephemeral message group 2504. Accordingly, the message duration parameter 2506 determines the duration of time that a particular ephemeral message 2502 is displayed to a receiving user, regardless of whether the receiving user is viewing that ephemeral message 2502 inside or outside the context of an ephemeral message group 2504.

The ephemeral timer system 402 may furthermore operationally remove a particular ephemeral message 2502 from the ephemeral message group 2504 based on a determination that it has exceeded an associated group participation parameter 2512. For example, when a sending user has established a group participation parameter 2512 of 24 hours from posting, the ephemeral timer system 402 will remove the relevant ephemeral message 2502 from the ephemeral message group 2504 after the specified 24 hours. The ephemeral timer system 402 also operates to remove an ephemeral message group 2504 when either the group participation parameter 2512 for each and every ephemeral message 2502 within the ephemeral message group 2504 has expired, or when the ephemeral message group 2504 itself has expired in terms of the group duration parameter 2508.

In certain use cases, a creator of a particular ephemeral message group 2504 may specify an indefinite group duration parameter 2508. In this case, the expiration of the group participation parameter 2512 for the last remaining ephemeral message 2502 within the ephemeral message group 2504 will determine when the ephemeral message group 2504 itself expires. In this case, a new ephemeral message 2502, added to the ephemeral message group 2504, with a new group participation parameter 2512, effectively extends the life of an ephemeral message group 2504 to equal the value of the group participation parameter 2512.

Responsive to the ephemeral timer system 402 determining that an ephemeral message group 2504 has expired (e.g., is no longer accessible), the ephemeral timer system 402 communicates with the interaction system 300 (and, for example, specifically the interaction client 304) to cause an indicium (e.g., an icon) associated with the relevant ephemeral message group 2504 to no longer be displayed within a user interface of the interaction client 304. Similarly, when the ephemeral timer system 402 determines that the message duration parameter 2506 for a particular ephemeral message 2502 has expired, the ephemeral timer system 402 causes the interaction client 304 to no longer display an indicium (e.g., an icon or textual identification) associated with the ephemeral message 2502.

MACHINE ARCHITECTURE

Figure 26:
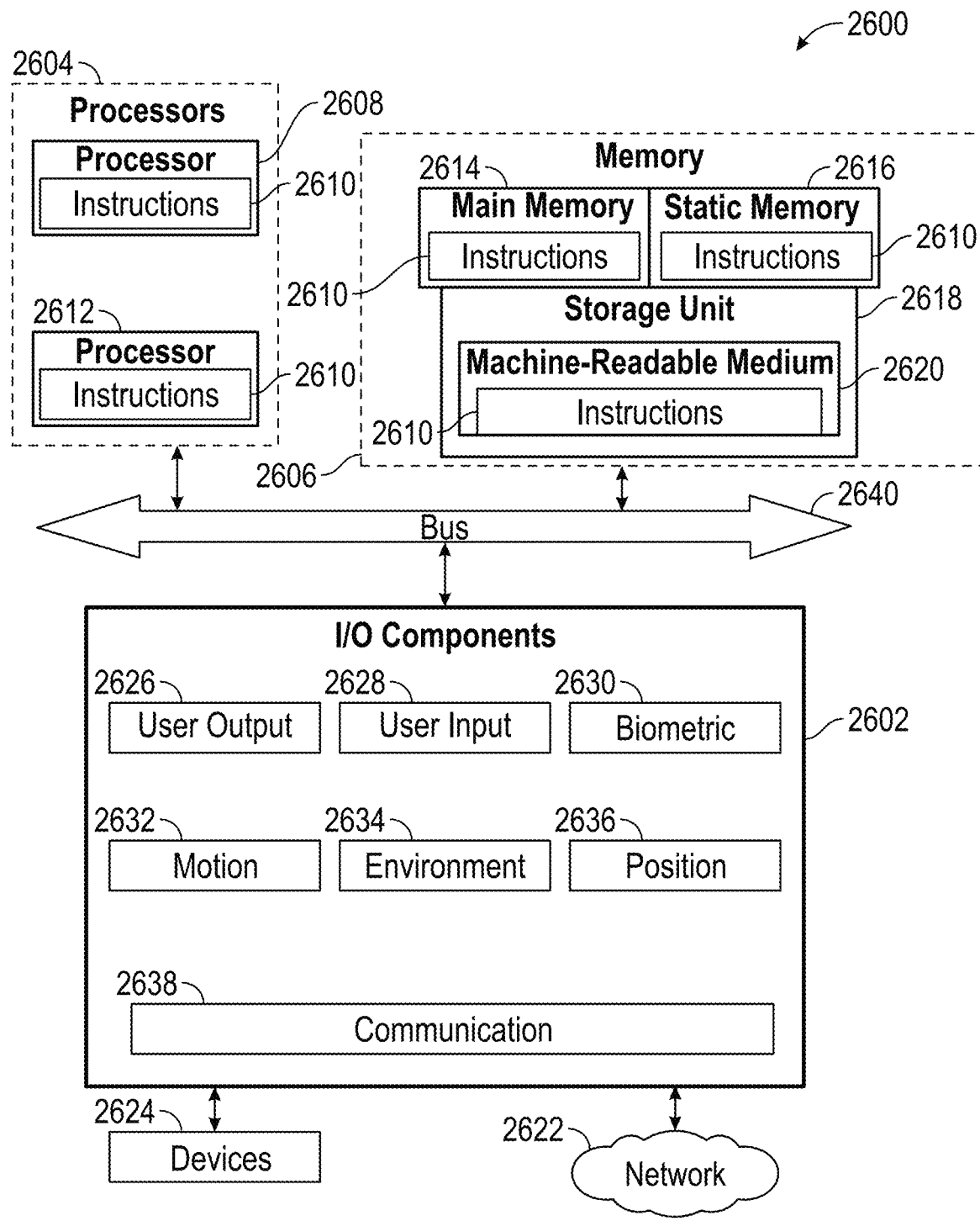
FIG. 26 is a diagrammatic representation of a machine in the form of a computer system within which a set of instructions may be executed for causing the machine to perform any one or more of the methodologies discussed herein, in accordance with some examples.

FIG. 26 is a diagrammatic representation of the machine 2600 within which instructions 2610 (e.g., software, a program, an application, an applet, an app, or other executable code) for causing the machine 2600 to perform any one or more of the methodologies discussed herein may be executed. For example, the instructions 2610 may cause the machine 2600 to execute any one or more of the methods described herein. The instructions 2610 transform the general, non-programmed machine 2600 into a particular machine 2600 programmed to carry out the described and illustrated functions in the manner described. The machine 2600 may operate as a standalone device or may be coupled (e.g., networked) to other machines. In a networked deployment, the machine 2600 may operate in the capacity of a server machine or a client machine in a server-client network environment, or as a peer machine in a peer-to-peer (or distributed) network environment. The machine 2600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2610, sequentially or otherwise, that specify actions to be taken by the machine 2600. Further, while only a single machine 2600 is illustrated, the term "machine" shall also be taken to include a collection of machines that individually or jointly execute the instructions 2610 to perform any one or more of the methodologies discussed herein. The machine 2600, for example, may comprise the client device 302 or any one of a number of server devices forming part of the interaction server system 308. In some examples, the machine 2600 may also comprise both client and server systems, with certain operations of a particular method or algorithm being performed on the server-side and with certain operations of the particular method or algorithm being performed on the client-side.

The machine 2600 may include processors 2604, memory 2606, and input/output I/O components 2602, which may be configured to communicate with each other via a bus 2640. In an example, the processors 2604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2608 and a processor 2612 that execute the instructions 2610. The term "processor" is intended to include multi-core processors that may comprise two or more independent processors (sometimes referred to as "cores") that may execute instructions contemporaneously. Although FIG. 26 shows multiple processors 2604, the machine 2600 may include a single processor with a single-core, a single processor with multiple cores (e.g., a multi-core processor), multiple processors with a single core, multiple processors with multiples cores, or any combination thereof.

The memory 2606 includes a main memory 2614, a static memory 2616, and a storage unit 2618, both accessible to the processors 2604 via the bus 2640. The main memory 2606, the static memory 2616, and storage unit 2618 store the instructions 2610 embodying any one or more of the methodologies or functions described herein. The instructions 2610 may also reside, completely or partially, within the main memory 2614, within the static memory 2616, within machine-readable medium 2620 within the storage unit 2618, within at least one of the processors 2604 (e.g., within the Processor's cache memory), or any suitable combination thereof, during execution thereof by the machine 2600.

The I/O components 2602 may include a wide variety of components to receive input, provide output, produce output, transmit information, exchange information, capture measurements, and so on. The specific I/O components 2602 that are included in a particular machine will depend on the type of machine. For example, portable machines such as mobile phones may include a touch input device or other such input mechanisms, while a headless server machine will likely not include such a touch input device. It will be appreciated that the I/O components 2602 may include many other components that are not shown in FIG. 26. In various examples, the I/O components 2602 may include user output components 2626 and user input components 2628. The user output components 2626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2602 may include biometric components 2630, motion components 2632, environmental components 2634, or position components 2636, among a wide array of other components. For example, the biometric components 2630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2632 include acceleration sensor components (e.g., accelerometer), gravitation sensor components, rotation sensor components (e.g., gyroscope).

The environmental components 2634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 302 may have a camera system comprising, for example, front cameras on a front surface of the client device 302 and rear cameras on a rear surface of the client device 302. The front cameras may, for example, be used to capture still images and video of a user of the client device 302 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 302 may also include a 360° camera for capturing 360° photographs and videos.

Further, the camera system of a client device 302 may include dual rear cameras (e.g., a primary camera as well as a depth-sensing camera), or even triple, quad or penta rear camera configurations on the front and rear sides of the client device 302. These multiple cameras systems may include a wide camera, an ultra-wide camera, a telephoto camera, a macro camera and a depth sensor, for example.

The position components 2636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2602 further include communication components 2638 operable to couple the machine 2600 to a network 2622 or devices 2624 via respective coupling or connections. For example, the communication components 2638 may include a network interface Component or another suitable device to interface with the network 2622. In further examples, the communication components 2638 may include wired communication components, wireless communication components, cellular communication components, Near Field. Communication (NFC) components, Bluetooth® components (e.g., Bluetooth® Low Energy), Wi-Fi® components, and other communication components to provide communication via other modalities. The devices 2624 may be another machine or any of a wide variety of peripheral devices (e.g., a peripheral device coupled via a USB).

Moreover, the communication components 2638 may detect identifiers or include components operable to detect identifiers. For example, the communication components 2638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2638, such as location via Internet Protocol (IP) geolocation, location via Wi-Fi® signal triangulation, location via detecting an NFC beacon signal that may indicate a particular location, and so forth.

The various memories (e.g., main memory 2614, static memory 2616, and memory of the processors 2604) and storage unit 2618 may store one or more sets of instructions and data structures (e.g., software) embodying or used by any one or more of the methodologies or functions described herein. These instructions (e.g., the instructions 2610), when executed by processors 2604, cause various operations to implement the disclosed examples.

The instructions 2610 may be transmitted or received over the network 2622, using a transmission medium, via a network interface device (e.g., a network interface component included in the communication components 2638) and using any one of several well-known transfer protocols (e.g., hypertext transfer protocol (HTTP)). Similarly, the instructions 2610 may be transmitted or received using a transmission medium via a coupling (e.g., a peer-to-peer coupling) to the devices 2624.

SOFTWARE ARCHITECTURE

Figure 27:
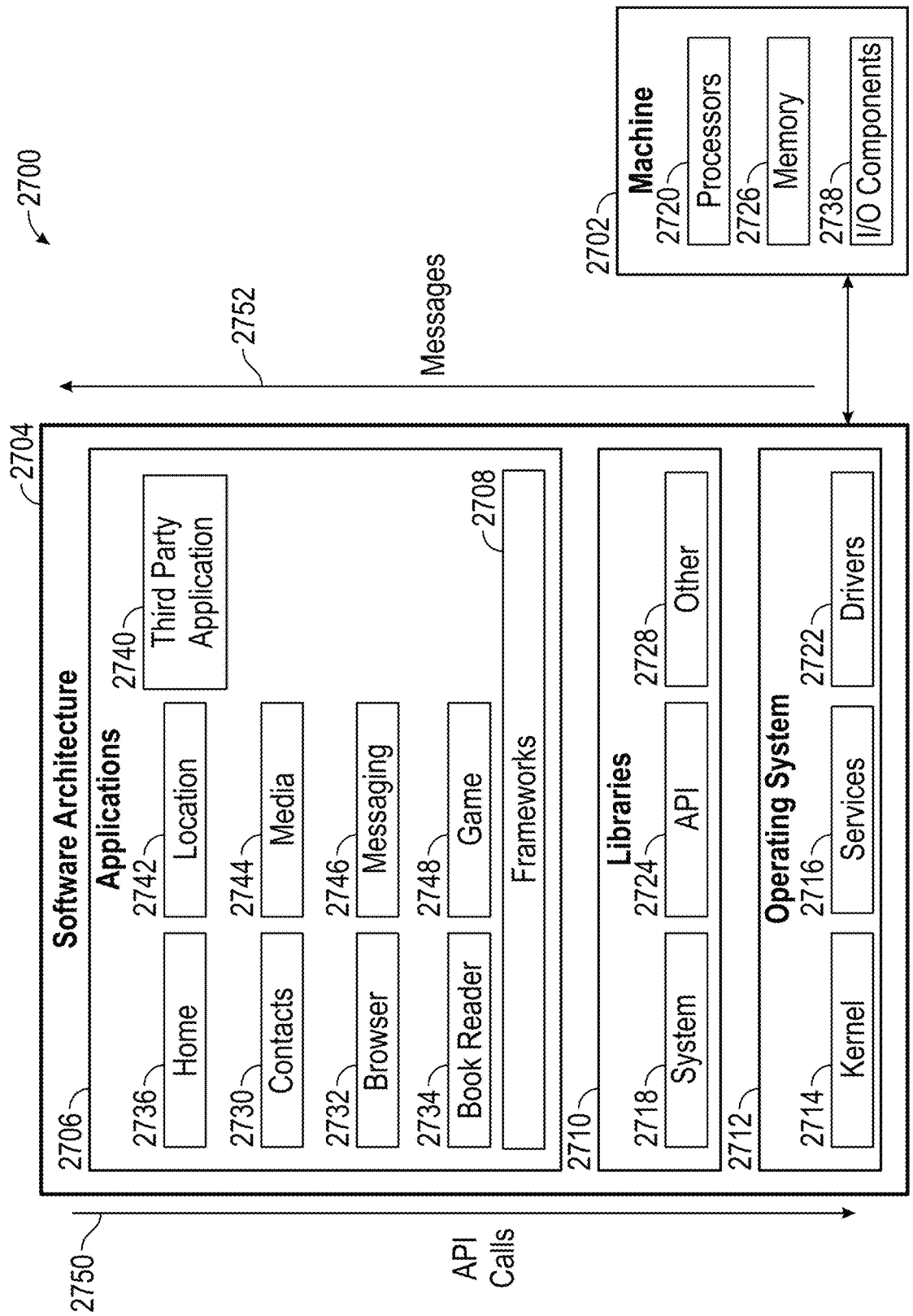
FIG. 27 is a block diagram showing a software architecture within which examples may be implemented.

FIG. 27 is a block diagram 2700 illustrating a software architecture 2704, which can be installed on any one or more of the devices described herein. The software architecture 2704 is supported by hardware such as a machine 2702 that includes processors 2720, memory 2726, and I/O components 2738. In this example, the software architecture 2704 can be conceptualized as a stack of layers, where each layer provides a particular functionality. The software architecture 2704 includes layers such as an operating system 2712, libraries 2710, frameworks 2708, and applications 2706. Operationally, the applications 2706 invoke API calls 2750 through the software stack and receive messages 2752 in response to the API calls 2750.

The operating system 2712 manages hardware resources and provides common services. The operating system 2712 includes, for example, a kernel 2714, services 2716, and drivers 2722. The kernel 2714 acts as an abstraction layer between the hardware and the other software layers. For example, the kernel 2714 provides memory management, processor management (e.g., scheduling), component management, networking, and security settings, among other functionalities. The services 2716 can provide other common services for the other software layers. The drivers 2722 are responsible for controlling or interfacing with the underlying hardware. For instance, the drivers 2722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2710 provide a common low-level infrastructure used by the applications 2706. The libraries 2710 can include system libraries 2718 (e.g., C standard library) that provide functions such as memory allocation functions, string manipulation functions, mathematic functions, and the like. In addition, the libraries 2710 can include API libraries 2724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2710 can also include a wide variety of other libraries 2728 to provide many other APIs to the applications 2706.

The frameworks 2708 provide a common high-level infrastructure that is used by the applications 2706. For example, the frameworks 2708 provide various graphical user interface (GUI) functions, high-level resource management, and high-level location services. The frameworks 2708 can provide a broad spectrum of other APIs that can be used by the applications 2706, some of which may be specific to a particular operating system or platform.

In an example, the applications 2706 may include a home application 2736, a contacts application 2730, a browser application 2732, a book reader application 2734, a location application 2742, a media application 2744, a messaging application 2746, a game application 2748, and a broad assortment of other applications such as a third-party application 2740. The applications 2706 are programs that execute functions defined in the programs. Various programming languages can be employed to create one or more of the applications 2706, structured in a variety of manners, such as object-oriented programming languages (e.g., Objective-C, Java, or C++) or procedural programming languages (e.g., C or assembly language). In a specific example, the third-party application 2740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2740 can invoke the API calls 2750 provided by the operating system 2712 to facilitate functionality described herein.

PROCESSING COMPONENTS

Figure 28:
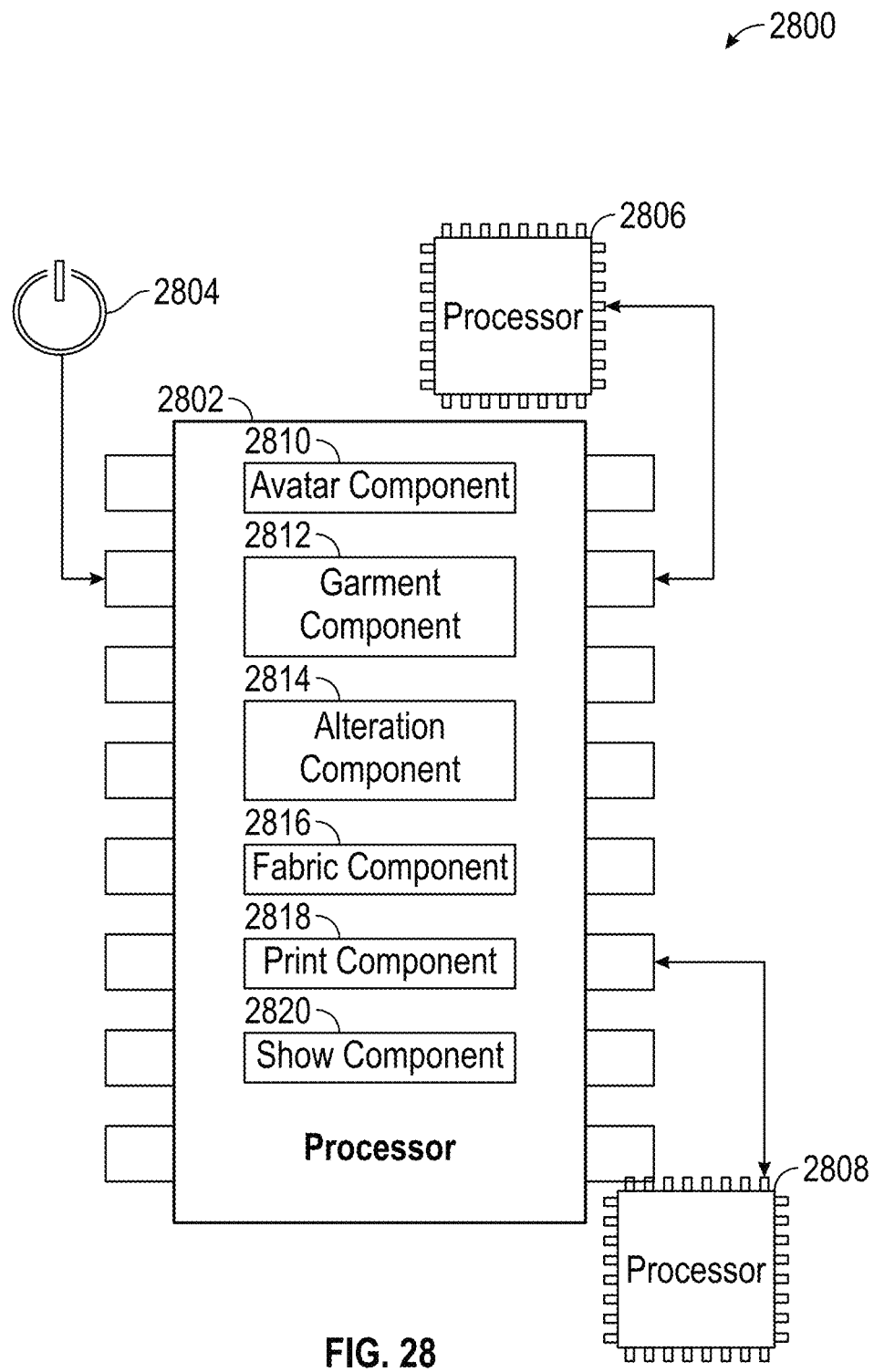
FIG. 28 is a diagrammatic representation of a processing environment, in accordance with some examples.

Turning now to FIG. 28, there is shown a diagrammatic representation of a processing environment 2800, which includes a processor 2802, a processor 2806, and a processor 2808 (e.g., a. GPU, CPU, or combination thereof).

The processor 2802 is shown to be coupled to a power source 2804, and to include (either permanently configured or temporarily instantiated) modules, namely an avatar component 2810, a garment component 2812, an alteration component 2814, a fabric component 2816, a print component 2818, and a show component 2820. These components may, in some examples, perform the various operations described herein.

CONCLUSION

In some examples, there is provided a method to facilitate customization of a digital avatar, the method includes causing presentation of a theme user interface, the theme user interface includes a plurality of themed indicia, each of the plurality of themed indicia being user-selectable and associated with a respective design theme, causing presentation of an avatar user interface, the avatar user interface includes a plurality of digital avatars, each of the plurality of digital avatar is being user-selectable, detecting selection of a selected digital avatar of the plurality of digital avatars within the avatar user interface, causing presentation of an garment user interface, the garment user interface includes a plurality of garment indicia, each of the plurality of garment indicia being user-selectable and representative of an associated garment item, detecting selection of a selected garment indicium, associated with a selected garment, of the plurality of garment indicia, causing presentation of an alteration interface within which dimensions of the associated garment item are adjustable by a user to generate an customized garment item, generating a composite avatar includes the customized garment item applied to the selected avatar, and receiving user input to enter the composite digital avatar into a virtual competition associated with the selected theme indicium.

The method may also include includes causing presentation of a fabric user interface, the fabric user interface includes a plurality of fabric indicia, each of the plurality of fabric indicia being user-selectable and representative of an associated fabric type, detecting user selection of a selected fabric indicium associated with a selected fabric type, and applying the selected fabric type to the selected garment item.

The method may also include includes causing presentation of a print user interface, the print user interface includes a plurality of print indicia, each of plurality of print indicia being user-selectable and representative of an associated print, detecting user selection of a selected print indicia associated with a selected print, and applying the selected print to the selected garment item.

The method may also include includes causing presentation of a design overlay user interface, the design overlay user interface includes a plurality of overlay indicia, each of the overlay indicia being user-selectable and representative of an associated overlay, detecting user selection of a selected overlay indicia associated with a selected overlay, and applying the selected overlay to the selected garment item.

The method may also include including, responsive to the detection of the selection of the theme indicium, of the plurality of themed indicia, associated with a selected design theme, causing presentation of a plurality of fashion design selections associated with a selected design theme.

The method may also include causing presentation of the composite avatar in an accessory user interface, the accessory interface includes a plurality of accessory indicia, each of the plurality of accessory indicia being user-selectable; responsive to detection of a selection of a selected accessory indicium of the plurality of accessory indicia, updating the composite digital avatar by applying an accessory associated with the selected accessory indicium to the composite digital avatar.

The method may also include where the plurality of design selections comprise one or more of a fabric selection, a print selection, and an overlay selection. Other technical features may be readily apparent to one skilled in the art from the following figures, descriptions, and claims.

In some examples, a computer-implemented method includes causing the presentation of a computer-guided process to enable a user to select a digital avatar, applying a digital garment to the digital avatar, modify the digital garment as applied to the digital avatar, and applying digital augmentations to the digital avatar in order to generate a composite digital avatar. The computer-implemented method also includes causing the presentation of a user interface to allow a user to selectively enter the composite digital avatar into a virtual competition. The computer-implemented method also includes receiving electronic votes, for the composite digital avatar and within the virtual competition, from a plurality of users of a social network platform. The computer-implemented method also includes determining and presenting an outcome of the virtual competition on the social networking platform.

The method may also include where the virtual competition is a fashion competition.

The method may also include where the virtual competition has a theme and is selected from a plurality of virtual competitions, each having different themes.

The method may also include where the altering of the digital garment includes displaying the digital garment as applied to the digital avatar and providing a graphical user interface alteration mechanism to enable the user to selectively adjust dimensions of the digital garment in situ as applied to the digital avatar.

The method may also include where the receiving of the electronic votes includes presenting the composite digital avatar created by the user together with a further digital avatar created by a further user within a common interface and enabling the plurality of users of the social network platform to select between the composite digital avatar and the further digital avatar. Other technical features may be readily apparent to one skilled in the art from the following figures, descriptions, and claims.

The method may also include where the enabling of the plurality of users of the social platform to select between the composite digital avatar and further digital avatar includes causing presentation, within a voting interface, of a graphical slider mechanism to select between the composite digital avatar and the further digital avatar. Other technical features may be readily apparent to one skilled in the art from the following figures, descriptions, and claims.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers, in some examples, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, in some examples, to one or more portions of a network that may be an ad hoc network, an intranet, ail extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, in some examples, to a device, physical entity, or logic having boundaries defined by function or subroutine calls, branch points. APIs, or other technologies that provide for the partitioning or modularization of particular processing or control functions. Components may be combined via. their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, in some examples, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method to facilitate customization of a digital avatar, the method comprising:
    causing presentation of a theme user interface, the theme user interface comprising a plurality of themed indicia, each of the plurality of themed indicia being user-selectable and associated with entering a runway show virtual competition having a respective design theme where a user customizes the digital avatar for the respective design theme, each of the plurality of themed indicia having different respective design themes;
    detecting selection of a selected themed indicium of the plurality of themed indicia within the theme user interface;
    causing presentation of an avatar user interface, the avatar user interface comprising a plurality of digital avatars, each of the plurality of digital avatars being user-selectable;
    detecting selection of a selected digital avatar of the plurality of digital avatars within the avatar user interface;
    causing presentation of a garment user interface, the garment user interface comprising a plurality of garment indicia, each of the plurality of garment indicia being user-selectable and representative of an associated garment item;
    detecting selection of a selected garment indicium, associated with a selected garment, of the plurality of garment indicia;
    causing presentation of an alteration interface within which dimensions of the associated garment item are adjustable by the user via alteration icons to generate a customized garment item, an alteration icon comprising a direction indicator indicative of a direction to adjust a dimension of the associated garment item;
    in response to an interaction with the alteration icon, causing the alteration icon to comprise at least two direction indicators of at least two directions to adjust the dimension of the associated garment item, the at least two directions corresponding with the at least two direction indicators;
    generating a composite avatar, using at least one processor, the composite avatar comprising the customized garment item applied to the selected avatar; and
    receiving user input to enter the composite digital avatar into the runway show virtual competition associated with the selected themed indicium.

2. The computer-implemented method of claim 1, wherein generating the customized garment item further comprises:
    causing presentation of a fabric user interface, the fabric user interface comprising a plurality of fabric indicia, each of the plurality of fabric indicia being user-selectable and representative of an associated fabric type,
    detecting user selection of a selected fabric indicium associated with a selected fabric type, and
    applying the selected fabric type to the selected garment item.

3. The computer-implemented method of claim 1, wherein generating the customized garment item further comprises:
    causing presentation of a print user interface, the print user interface comprising a plurality of print indicia, each of plurality of print indicia being user-selectable and representative of an associated print,
    detecting user selection of a selected print indicia associated with a selected print, and
    applying the selected print to the selected garment item.

4. The computer-implemented method of claim 1, wherein generating the customized garment item further comprises:
    causing presentation of a design overlay user interface, the design overlay user interface comprising a plurality of overlay indicia, each of the overlay indicia being user-selectable and representative of an associated overlay,
    detecting user selection of a selected overlay indicia associated with a selected overlay, and
    applying the selected overlay to the selected garment item.

5. The computer-implemented method of claim 1, further comprising:
    responsive to the detection of the selection of the selected theme indicium, associated with a selected design theme, causing presentation of a plurality of design selections associated with the selected design theme.

6. The computer-implemented method of claim 5, wherein the plurality of design selections associated with the selected design theme comprise one or more of a fabric selection, a print selection, and an overlay selection.

7. The computer-implemented method of claim 1, further comprising:
    causing presentation of the composite avatar in an accessory user interface, the accessory interface comprising a plurality of accessory indicia, each of the plurality of accessory indicia being user-selectable; and
    responsive to detection of selection of a selected accessory indicium of the plurality of accessory indicia, updating the composite digital avatar by applying an accessory associated with the selected accessory indicium to the composite digital avatar.

8. A computer-implemented method comprising:
    causing presentation of a computer-guided process to enable a user to:
        select a digital avatar,
        select a themed indicium from a plurality of themed indicia, each of the plurality of themed indicia being user-selectable and associated with entering a runway show virtual competition having a respective design theme where a user customizes the digital avatar for the respective design theme, each of the plurality of themed indicia having different respective design themes,
        apply a digital garment to the digital avatar,
        modify the digital garment as applied to the digital avatar via alteration icons, an alteration icon comprising a direction indicator indicative of a direction to adjust a dimension of the digital garment, wherein in response to an interaction with the alteration icon, the alteration icon is caused to comprise at least two direction indicators of at least two directions to adjust the dimensions of digital garment, the at least two directions corresponding with the at least two direction indicators, and
        apply digital augmentations to the digital avatar in order to generate a composite digital avatar;
    causing presentation of a user interface to allow the user to selectively enter the composite digital avatar into the runway show virtual competition;
    receiving electronic votes, for the composite digital avatar and within the runway show virtual competition, from a plurality of users of a social network platform; and determining, using at least one processor, and causing presentation of an outcome of the runway show virtual competition on the social networking platform.

9. The computer-implemented method of claim 8, further comprising:
generating and transmitting an invitation to one or more other users of the social network platform to participate in the runway show virtual competition having the respective design theme associated with the selected theme indicium.

10. The computer-implemented method of claim 8, wherein the design theme is associated with a restricted set of customization items for the modifying of the digital garment.

11. The computer-implemented method of claim 8, wherein the modifying of the digital garment comprises displaying the digital garment as applied to the digital avatar and wherein each alteration icon corresponds to a respective direction in which a respective dimension of the digital garment is adjusted.

12. The computer-implemented method of claim 8, wherein the receiving of the electronic votes comprises causing presentation of the composite digital avatar created by the user together with a further digital avatar created by a further user within a common interface and enabling the plurality of users of the social network platform to select between the composite digital avatar and the further digital avatar.

13. The computer-implemented method of claim 12, wherein the enabling of the plurality of users of the social platform to select between the composite digital avatar and further digital avatar comprises causing presentation, within a voting interface, of a graphical slider mechanism to select between the composite digital avatar and the further digital avatar.

14. A computing apparatus comprising:
at least one processor; and
a memory storing instructions that, when executed by the at least one processor, configure the computing apparatus to perform operations comprising:
causing presentation of a theme user interface, the theme user interface comprising a plurality of themed indicia, each of the plurality of themed indicia being user-selectable and associated with entering a runway show virtual competition having a respective design theme where a user customizes a digital avatar for the respective design theme, each of the plurality of themed indicia having different respective design themes;
detecting selection of a selected themed indicium of the plurality of themed indicia within the theme user interface;
causing presentation of an avatar user interface, the avatar user interface comprising a plurality of digital avatars, each of the plurality of digital avatars being user-selectable;
detecting selection of a selected digital avatar of the plurality of digital avatars within the avatar user interface;
causing presentation of a garment user interface, the garment user interface comprising a plurality of garment indicia, each of the plurality of garment indicia being user-selectable and representative of an associated garment item;
detecting selection of a selected garment indicium, associated with a selected garment, of the plurality of garment indicia;
causing presentation of an alteration interface within which dimensions of the associated garment item are adjustable by the user via alteration icons to generate a customized garment item, an alteration icon comprising a direction indicator indicative of a direction to adjust a dimension of the associated garment item;
in response to an interaction with the alteration icon, causing the alteration icon to comprise at least two direction indicators of at least two directions to adjust the dimensions of the associated garment item, the at least two directions corresponding with the at least two direction indicators;
generating a composite avatar comprising the customized garment item applied to the selected avatar; and
receiving user input to enter the composite digital avatar into the runway show virtual competition associated with the selected themed indicium.

15. A computing apparatus comprising:
at least one processor; and
a memory storing instructions that, when executed by the at least one processor, configure the apparatus to perform operations comprising:
causing presentation of a computer-guided process to enable a user to:
select a digital avatar,
select a themed indicium from a plurality of themed indicia, each of the plurality of themed indicia being user-selectable and associated with entering a runway show virtual competition having a respective design theme where a user customizes the digital avatar for the respective design theme, each of the plurality of themed indicia having different design themes,
apply a digital garment to the digital avatar,
modify the digital garment as applied to the digital avatar via alteration icons, an alteration icon comprising a direction indicator indicative of a direction to adjust a dimension of the digital garment, wherein in response to an interaction with the alteration icon, the alteration icon is caused to comprise at least two direction indicators of at least two directions to adjust the dimensions of the digital garment, the at least two directions corresponding with the at least two direction indicators, and
apply digital augmentations to the digital avatar in order to generate a composite digital avatar;
causing presentation of a user interface to allow the user to selectively enter the composite digital avatar into the runway show virtual competition;
receiving electronic votes, for the composite digital avatar and within the runway show virtual competition, from a plurality of users of a social network platform; and
determining and causing presentation of an outcome of the runway show virtual competition on the social networking platform.

16. The computing apparatus of claim 15, further comprising:
generating and transmitting an invitation to one or more other users of the social network platform to participate in the runway show virtual competition having the respective design theme associated with the selected theme indicium.

17. The computing apparatus of claim 15, wherein the design theme is associated with a restricted set of customization items for the modifying of the digital garment.

18. The computing apparatus of claim 15, wherein the modifying of the digital garment comprises causing display of the digital garment as applied to the digital avatar and wherein each alteration icon corresponds to a respective direction in which a respective dimension of the digital garment is adjusted.

19. The computing apparatus of claim 15, wherein the receiving of the electronic votes comprises causing presentation the composite digital avatar created by the user together with a further digital avatar created by a further user within a common interface and enabling the plurality of users of the social network platform to select between the composite digital avatar and the further digital avatar.

20. The computing apparatus of claim 19, wherein the enabling of the plurality of users of the social platform to select between the composite digital avatar and further digital avatar comprises cause presentation, within a voting interface, of a graphical slider mechanism to select between the composite digital avatar and the further digital avatar.

* * * * *